US007236884B2

(12) United States Patent
Matsumoto et al.

(10) Patent No.: US 7,236,884 B2
(45) Date of Patent: Jun. 26, 2007

(54) AUTOMOTIVE LANE DEVIATION PREVENTION APPARATUS

(75) Inventors: Shinji Matsumoto, Kanagawa (JP); Satoshi Tange, Kanagawa (JP); Tatsuya Suzuki, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 166 days.

(21) Appl. No.: 10/825,108

(22) Filed: Apr. 16, 2004

(65) Prior Publication Data

US 2004/0215393 A1 Oct. 28, 2004

(30) Foreign Application Priority Data

Apr. 23, 2003 (JP) ............................. 2003-118896

(51) Int. Cl.
*G06G 7/78* (2006.01)

(52) U.S. Cl. .................... 701/300; 701/41; 701/70; 701/301; 340/435; 340/436; 340/901

(58) Field of Classification Search ................ 701/300, 701/41, 96, 1, 23, 70, 301; 180/168, 446; 340/435, 436, 439, 576, 903; 342/70
See application file for complete search history.

(56) References Cited

U.S. PATENT DOCUMENTS

| 4,727,492 | A  | * | 2/1988  | Reeve et al. ............... 701/25 |
| 6,014,595 | A  | * | 1/2000  | Kobayashi ................. 701/1 |
| 6,021,367 | A  | * | 2/2000  | Pilutti et al. ............. 701/41 |
| 6,057,754 | A  | * | 5/2000  | Kinoshita et al. ......... 340/435 |
| 6,059,067 | A  | * | 5/2000  | Shibahata et al. ........ 180/338 |
| 6,216,079 | B1 | * | 4/2001  | Matsuda .................. 701/70 |
| 6,334,656 | B1 | * | 1/2002  | Furukawa et al. ........ 303/146 |
| 6,411,901 | B1 | * | 6/2002  | Hiwatashi et al. ........ 701/301 |
| 6,487,501 | B1 | * | 11/2002 | Jeon ........................ 701/301 |
| 6,489,887 | B2 | * | 12/2002 | Satoh et al. .............. 340/436 |
| 2002/0013647 | A1 | * | 1/2002 | Kawazoe et al. .......... 701/41 |
| 2003/0014162 | A1 | * | 1/2003 | Sadano ...................... 701/1 |
| 2004/0098197 | A1 |   | 5/2004  | Matsumoto et al. |
| 2004/0102884 | A1 |   | 5/2004  | Tange et al. |
| 2004/0107035 | A1 |   | 6/2004  | Tange et al. |

FOREIGN PATENT DOCUMENTS

| JP | 11-180327 A | 7/1999 |
| JP | 2000-33860 A | 2/2000 |
| JP | 2001-310719 A | 11/2001 |

* cited by examiner

OTHER PUBLICATIONS

U.S. Appl. No. 10/828,462, filed Apr. 21, 2004, Matsumoto et al.

*Primary Examiner*—Thomas Black
*Assistant Examiner*—Marie A. Weiskopf
(74) *Attorney, Agent, or Firm*—Foley & Lardner LLP

(57) ABSTRACT

An automotive lane deviation prevention apparatus includes an electronic control unit configured to be electronically connected to a yawing-motion control actuator such as braking force actuators or a steering actuator for lane deviation prevention and vehicle yawing motion control purposes. The control unit has a processor programmed for determining whether or not a host vehicle is traveling on predetermined irregularities formed on or close to either one of a left-hand side lane marking line and a right-hand side lane marking line of a driving lane. The processor is further programmed for executing vehicle yawing motion control by which the host vehicle returns to a central position of the driving lane, when the host vehicle is traveling on the predetermined irregularities.

17 Claims, 10 Drawing Sheets

RIDGED PORTION FORMED WHITE LANE MARKING

FIG.9A
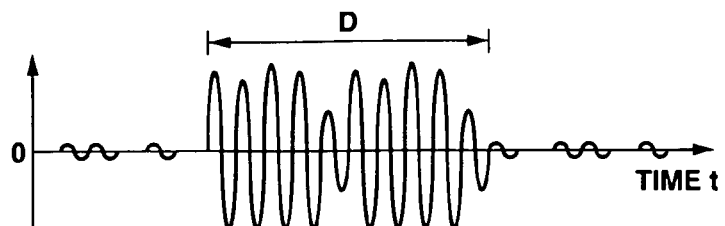
FIG.9B
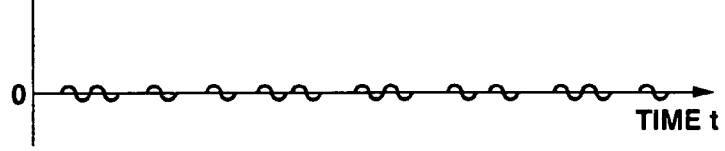
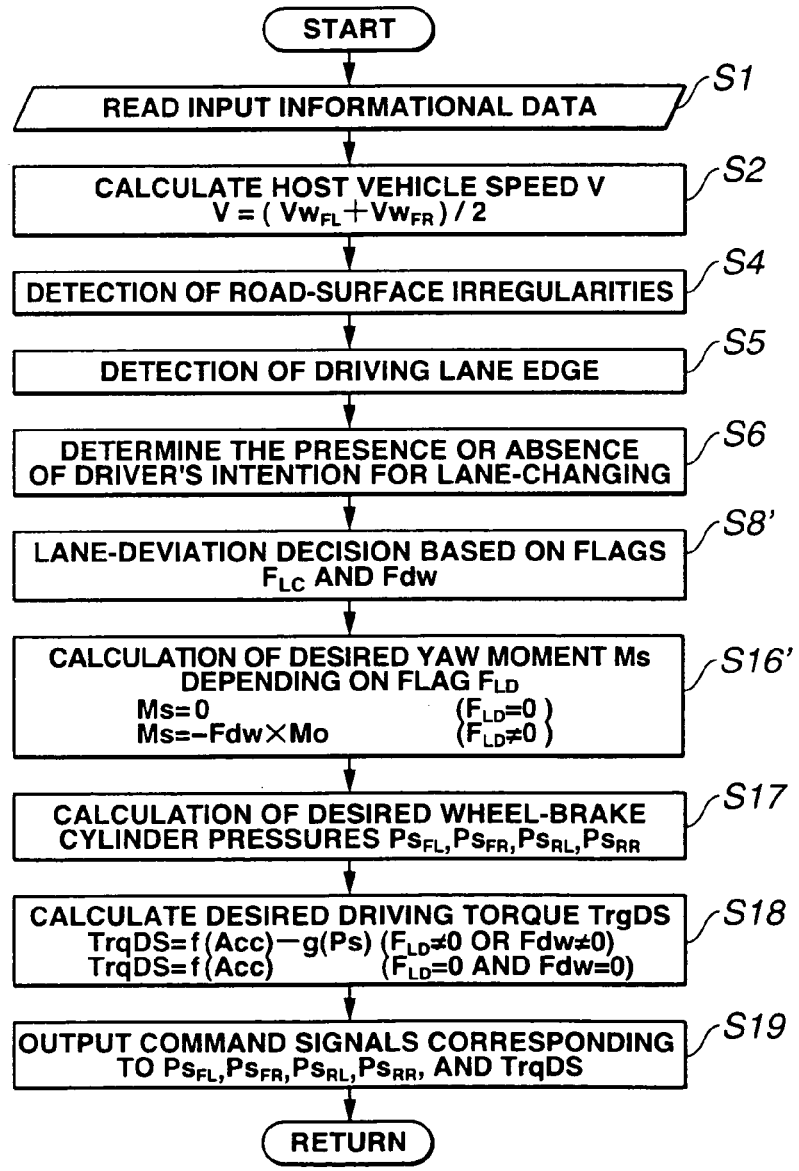

RECESSED PORTION FORMED ON WHITE LANE MARKING

AUTOMOTIVE LANE DEVIATION PREVENTION APPARATUS

TECHNICAL FIELD

The present invention relates to an automotive lane deviation prevention apparatus, and specifically to the improvement of an automatic lane deviation prevention control technology capable of preventing a host vehicle from deviating from its driving lane even when the host vehicle tends to deviate from the driving lane under a condition where there is poor visibility owing to extreme weather situations such as a thick fog, strong snowfall, extreme rain or icing of the host vehicle, or even when white lane markers or white lane markings are partly covered by snow.

BACKGROUND ART

In recent years, there have been proposed and developed various automatic lane deviation prevention control technologies and vehicle dynamics control technologies. On automotive vehicles having both the vehicle dynamics control (VDC) function and lane deviation prevention (LDP) function, generally, there are two types of lane deviation prevention control, namely, an LDP control system using a steering actuator and an LDP control system using braking force actuators. In the steering-actuator equipped LDP control system, lane deviation is prevented by producing a yaw moment by controlling the steering actuator depending on a host vehicle's lateral displacement or a host vehicle's lateral deviation from a central axis (a reference axis) of the current host vehicle's driving lane. One such steering-actuator equipped LDP control system has been disclosed in Japanese Patent Provisional Publication No. 11-180327 (hereinafter is referred to as JP11-180327).

On the other hand, in the braking-force-actuator equipped LDP control system, lane deviation is prevented by producing a yaw moment by controlling each braking force actuator, such as an ABS-system hydraulic modulator, depending on a host vehicle's lateral deviation from a central axis of the current host vehicle's driving lane. Usually, in order to produce the yaw moment for lane deviation avoidance, braking forces are applied to the road wheels opposite to the direction that the lane deviation occurs. One such braking-force-actuator equipped LDP control system has been disclosed in Japanese Patent Provisional Publication Nos. 2000-33860 (hereinafter is referred to as JP2000-33860) and 2001-310719 (hereinafter is referred to as JP2001-310719).

An LDP control system as disclosed in JP11-180327, JP2000-33860, and JP2001-310719, often uses a vehicle-mounted charge-coupled device (CCD) camera and a camera controller as an external recognizing sensor, which functions to detect a position of the host vehicle within the host vehicle's traffic lane and whose sensor signal is used for the lane deviation avoidance control or lane deviation prevention control. Within the camera controller, on the basis of an image-processing picture image data in front of the host vehicle and captured by the CCD camera, a white lane marking, such as a white line, is detected and thus the current host vehicle's traffic lane, exactly, the current position information of the host vehicle within the host vehicle's driving lane, in other words, information regarding whether the host vehicle tends to deviate from the driving lane, is detected.

SUMMARY OF THE INVENTION

However, in case of white-lane-marking detection based on the picture image data captured by the vehicle-mounted camera, it is difficult to precisely detect or determine the lane deviation tendency of the host vehicle from the driving lane when there is reduced visibility due to extreme weather situations for example a thick fog, strong snowfall, extreme rain, or icing of the host vehicle. That is, in the extreme weather situations, the LDP control system's ability to avoid the host vehicle's lane deviation is remarkably lowered.

Accordingly, it is an object of the invention to provide an automotive lane deviation prevention (LDP) apparatus, capable of greatly enhancing the lane deviation prevention performance even when there is poor visibility owing to extreme weather situations such as a thick fog, strong snowfall, extreme rain or icing of the host vehicle.

In order to accomplish the aforementioned and other objects of the present invention, an automotive lane deviation prevention apparatus comprises a processor programmed to perform the following, executing vehicle yawing motion control by which a host vehicle returns to a central position of a driving lane, when the host vehicle is traveling on predetermined irregularities formed on or close to either one of a left-hand side lane marking line and a right-hand side lane marking line of the driving lane.

According to another aspect of the invention, a method of preventing lane deviation of a host vehicle employing braking force actuators that adjust braking forces applied to respective road wheels, the method comprises detecting whether the host vehicle is traveling on predetermined irregularities formed on or close to either one of a left-hand side lane marking line and a right-hand side lane marking line of a driving lane, and executing lane deviation prevention control by feedback control of the braking forces applied to the road wheels so that the host vehicle returns to a central position of the driving lane, when the host vehicle is traveling on the predetermined irregularities.

According to a further aspect of the invention, an automotive lane deviation prevention apparatus comprises sensors that detect whether a host vehicle is traveling on predetermined irregularities formed on or close to either one of a left-hand side lane marking line and a right-hand side lane marking line of a driving lane, a yawing-motion control actuator that adjusts a yaw moment exerted on the host vehicle, a control unit being configured to be electronically connected to the yawing-motion control actuator and the sensors, for controlling the yawing motion of the host vehicle in response to signals from the sensors for vehicle yawing motion control purposes, the control unit comprising road-surface irregularities detection means for determining, based on the signals from the sensors, whether the host vehicle is traveling on the predetermined irregularities, and vehicle yawing motion control means for executing vehicle yawing motion control by which the host vehicle returns to a central position of the driving lane, when the road-surface irregularities detection means determines that the host vehicle is traveling on the predetermined irregularities.

According to another aspect of the invention, a method of preventing lane deviation of a host vehicle employing braking force actuators that adjust braking forces applied to respective road wheels, the method comprises detecting whether the host vehicle is traveling on predetermined irregularities formed on or close to either one of a left-hand side lane marking line and a right-hand side lane marking line of a driving lane, and executing lane deviation prevention control by feedback-controlling the braking forces applied to the road wheels so that the host vehicle returns to a central position of the driving lane, when the host vehicle is traveling on the predetermined irregularities.

According to a still further aspect of the invention, a method of preventing lane deviation of a host vehicle employing a steering actuator that adjusts a steering torque applied to a steering wheel, the method comprises detecting whether the host vehicle is traveling on predetermined irregularities formed on or close to either one of a left-hand side lane marking line and a right-hand side lane marking line of a driving lane, and executing lane deviation prevention control by feedback-controlling the steering torque applied to the steering wheel so that the host vehicle returns to a central position of the driving lane, when the host vehicle is traveling on the predetermined irregularities.

The other objects and features of this invention will become understood from the following description with reference to the accompanying drawings.

BRIEF DESCRIPTION OF THE DRAWINGS

FIGS. 9A–9B are time charts respectively showing variations in front-left wheel acceleration/deceleration and variations in front-right wheel acceleration/deceleration.

FIG. 10 is a flow chart showing a modified control routine (modified arithmetic and logic operations) executed within a braking/driving force control unit incorporated in the LDP apparatus of the embodiment.

DESCRIPTION OF THE PREFERRED EMBODIMENTS

Figure 1:
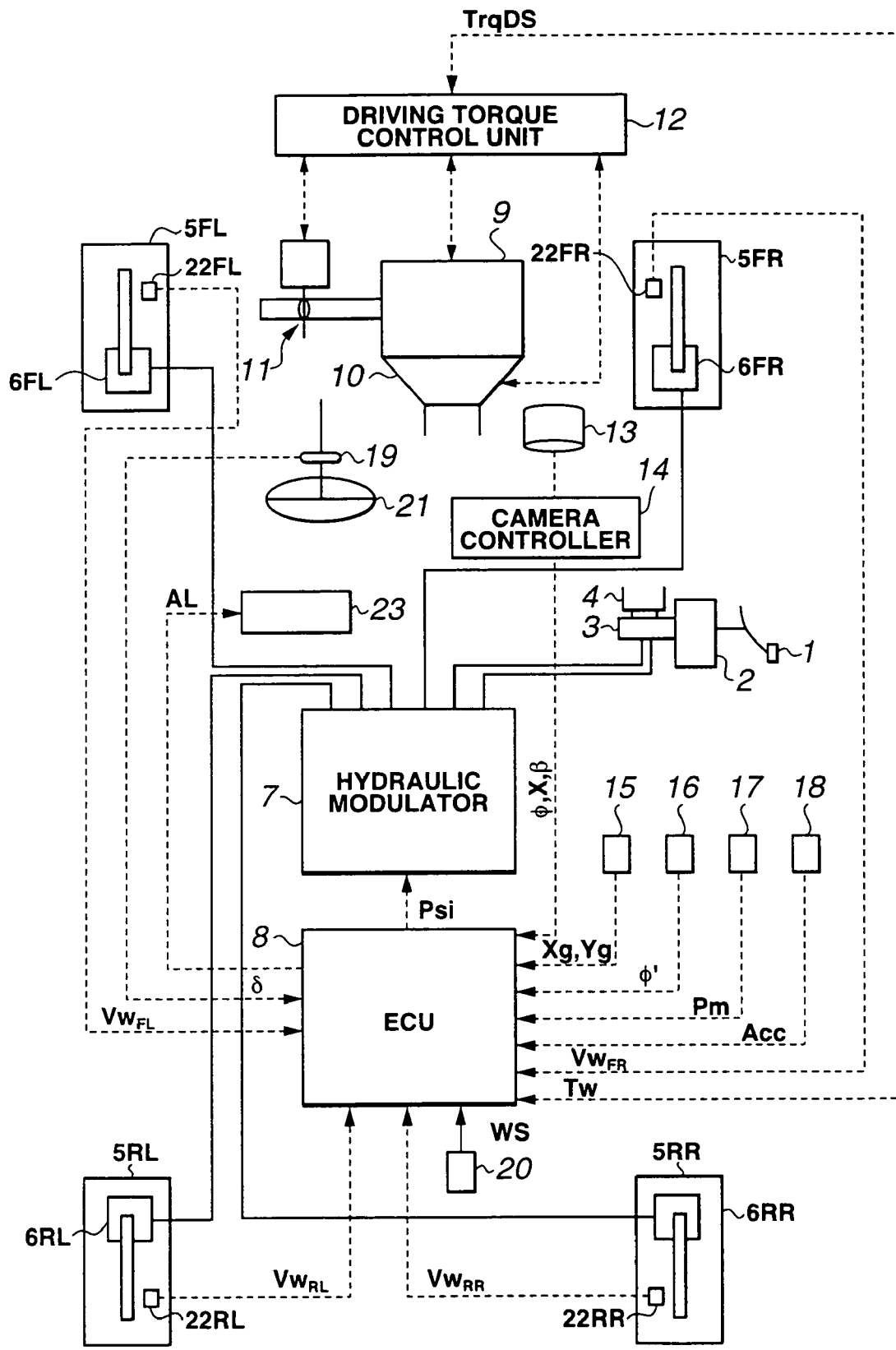
FIG. 1 is a system block diagram illustrating an embodiment of an automotive lane deviation prevention (LDP) apparatus.

Referring now to the drawings, particularly to FIG. 1, the lane deviation prevention (LDP) apparatus of the embodiment is exemplified in an adaptive cruise control (ACC) system equipped rear-wheel-drive vehicle employing an automatic transmission 10 and a rear differential. In the LDP apparatus of the embodiment shown in FIG. 1, as a braking force control system, which regulates hydraulic brake pressures of individual wheel-brake cylinders (i.e., front-left, front-right, rear-left, and rear-right wheel-brake cylinders) independently of each other, a four-channel braking control system such as a four-channel ABS system for anti-skid control or a four-channel traction control system for traction control is utilized. In FIG. 1, reference sign 1 denotes a brake pedal, reference sign 2 denotes a brake booster, reference sign 3 denotes a master cylinder (exactly, a tandem master cylinder used for a dual brake system split into two sections, namely front and rear hydraulic brake sections), and reference sign 4 denotes a brake fluid reservoir. Usually, a brake fluid pressure, risen by master cylinder 3 depending on the amount of depression of brake pedal 1, is supplied to each of a front-left wheel-brake cylinder 6FL for a front-left road wheel 5FL, a front-right wheel-brake cylinder 6FR for a front-right road wheel 5FR, a rear-left wheel-brake cylinder 6RL for a rear-left road wheel 5RL, and a rear-right wheel-brake cylinder 6RR for a rear-right road wheel 5RR. Front-left, front-right, rear-left, and rear-right wheel-brake cylinder pressures are regulated independently of each other by means of a brake fluid pressure control circuit (a wheel cylinder pressure control unit) or a hydraulic modulator 7, which is disposed between master cylinder 3 and each of wheel-brake cylinders 6FL, 6FR, 6RL, and 6RR. Hydraulic modulator 7 includes hydraulic pressure control actuators (braking force actuators) respectively associated with first-channel (front-left), second-channel (front-right), third-channel (rear-left), and fourth-channel (rear-right) brake circuits, such that front-left, front-right, rear-left, and rear-right wheel-brake cylinder pressures are built up, held, or reduced independently of each other. Each of the hydraulic pressure control actuators of hydraulic modulator 7 is comprised of a proportional solenoid valve such as an electro-magnetically-controlled solenoid valve that regulates the wheel-brake cylinder pressure to a desired pressure level. Each of the electromagnetically-controlled solenoid valves of hydraulic modulator 7 is responsive to a command signal from a braking/driving force control unit, simply an electronic control unit (ECU) 8, for regulating the wheel-cylinder pressure of each of wheel-brake cylinders 6FL–6RR in response to the command signal value from the output interface of ECU 8, regardless of the braking action (brake-pedal depression) manually created by the driver's foot.

The ACC system equipped rear-wheel-drive vehicle of the embodiment of FIG. 1 also includes an electronic driving torque control unit 12 that controls a driving torque transmitted to rear road wheels 5RL and 5RR serving as drive wheels, by controlling an operating condition of an engine 9, a selected transmission ratio of automatic transmission 10, and/or a throttle opening of a throttle valve 11 (correlated to an accelerator opening Acc). Concretely, the operating condition of engine 9 can be controlled by controlling the amount of fuel injected or an ignition timing. Also, the engine operating condition can be controlled by the throttle opening control. Driving torque control unit 12 is designed to individually control the driving torque transmitted to rear road wheels 5RL and 5RR (drive wheels). Additionally, driving torque control unit 12 is responsive to a driving-torque command signal from ECU 8 in a manner so as to control the driving torque depending on the driving-torque command signal value.

The ACC system equipped rear-wheel-drive vehicle of the embodiment of FIG. 1 also includes a stereocamera with a charge-coupled device (CCD) image sensor, simply, a charge-coupled device (CCD) camera (a picture image pick-up device) 13 and a camera controller (serving as a lane marking line detector) 14 as an external recognizing sensor, which functions to detect the current position information of the ACC system equipped vehicle (the host vehicle) within the driving lane (the host vehicle's traffic lane) and whose sensor signal is used for lane deviation prevention control. Within camera controller 14, on the basis of an image-processing picture image data in front of the host vehicle and captured by CCD camera 13, a lane marker or lane marking (or a white lane marking line by which two adjacent lanes are divided), such as a white line, is detected and thus the current host vehicle's traffic lane, exactly, the current position information of the host vehicle within the host vehicle's driving lane, is detected. Additionally, the processor of camera controller 14 calculates or estimates, based on the image data from CCD camera 13 indicative of the picture image, a host vehicle's yaw angle φ with respect to the sense of the current host vehicle's driving lane, a host vehicle's lateral displacement or a host vehicle's lateral deviation X from a central axis (a reference axis) of the current host vehicle's driving lane, and a curvature β of the current host vehicle's driving lane. The host vehicle's yaw angle φ means an angle between the sense of the current host vehicle's driving lane and the host vehicle's x-axis of a vehicle axis system (x, y, z). When the white lane marker or lane marking, such as a white line, in front of the host vehicle, has worn away or when the lane markers or lane markings are partly covered by snow, it is impossible to precisely recognize with certainty the lane markers or lane markings. In such a case, each of detection parameters, namely, the host vehicle's yaw angle φ, lateral deviation X, and curvature β is set to "0".

Electronic control unit (ECU) 8 generally comprises a microcomputer that includes a central processing unit (CPU) or a microprocessor (MPU), memories (RAM, ROM), and an input/output interface (I/O). In addition to the signals indicative of parameters φ, X, and β calculated by camera controller 14, and the signal indicative of a driving torque Tw, controlled and produced by driving-torque control unit 12, the input/output interface (I/O) of ECU 8 receives input information from various engine/vehicle switches and sensors, such as an acceleration sensor (G sensor) 15, a yaw rate sensor 16, a master-cylinder pressure sensor 17, an accelerator opening sensor 18, a steer angle sensor 19, front-left, front-right, rear-left, and rear-right wheel speed sensors 22FL, 22FR, 22RL, and 22RR, and a direction indicator switch 20. As seen from the system block diagram of FIG. 1, for mutual communication via a data link, ECU 8 is electrically connected to driving torque control unit 12. Acceleration sensor 15 is provided to detect a longitudinal acceleration Xg and a lateral acceleration Yg, exerted on the host vehicle, and/or to detect a vertical acceleration of a point of the vehicle suspension, moving up and down. Yaw rate sensor 16 is provided to detect a yaw rate φ' (one of the host vehicle's driving states) resulting from a yaw moment acting on the host vehicle. Master-cylinder pressure sensor 17 is provided to detect a master-cylinder pressure Pm of master cylinder 3, that is, the amount of depression of brake pedal 1. Accelerator opening sensor 18 is provided to detect an accelerator opening Acc (correlated to a throttle opening), which is dependent on a manipulated variable of the driver's accelerator-pedal depression. Steer angle sensor 19 is provided to detect steer angle δ of a steering wheel 21. Front-left, front-right, rear-left, and rear-right wheel speed sensors 22FL, 22FR, 22RL, and 22RR are provided respectively to detect front-left, front-right, rear-left, and rear-right wheel speeds $Vw_{FL}$, $Vw_{FR}$, $Vw_{RL}$, and $Vw_{RR}$, which are collectively referred to as "Vwi". Direction indicator switch 20 is provided to detect whether a direction indicator is turned on and also to detect the direction indicated by the direction indicator, and to output a direction indicator switch signal WS. In addition to CCD camera 13 and camera controller 14, a radar controller using a radar sensor, such as a scanning laser radar sensor serving as an object detector, may be provided to more precisely capture, recognize, sense, or detect a preceding vehicle (or a relevant target vehicle), or a frontally located object, or a running vehicle on the adjacent lane. In such a case, in addition to the input informational data, namely the host vehicle's yaw angle φ, host vehicle's lateral deviation X, and curvature β, and information regarding whether or not the white lane marking, such as a white line, in front of the host vehicle, is recognized or captured by CCD camera 13 (in other words, a recognition signal or a decision signal regarding whether or not the white lane marking is detected by camera controller 14), additional input information, that is, a relative longitudinal distance Lx from the host vehicle to the preceding vehicle (or the frontally-located object), a relative lateral distance Ly from the host vehicle to the running vehicle on the adjacent lane (or the adjacently-located object), and a width Hs of the preceding vehicle or the frontally- or adjacently-located object can be detected or estimated and input into the input interface of ECU 8. Within the ACC system, these input informational data are used for collision avoidance control as well as lane deviation prevention control. The previously-noted CCD camera 13 and camera controller 14 and the radar controller function as an external recognizing detector or a lane marking line detector or a traveling-path condition detector, which detects a condition of the path where the host vehicle is traveling. In the presence of a directionality or polarity concerning left or right directions of each of the vehicle driving state indicative data and the traveling-path condition indicative data, namely, yaw rate φ', lateral acceleration Yg, steer angle δ, yaw angle φ, and lateral deviation X, a change in the vehicle driving state indicative data to the left is indicated as a positive value, while a change in the vehicle driving state indicative data to the right is indicated as a negative value. More concretely, during a left turn, yaw rate φ', lateral acceleration Yg, steer angle δ, and yaw angle φ are all indicated as positive values. Conversely during a right turn, these parameters φ', Yg, δ, and φ are all indicated as negative values. On the other hand, lateral deviation X is indicated as a positive value when the host vehicle is deviated from the central axis of the current driving lane to the left. Conversely when the host vehicle is deviated from the central axis of the current driving lane to the right, lateral deviation X is indicated as a negative value. The positive signal value of direction indicator switch signal WS from direction indicator switch 20 means a left turn (counterclockwise rotation of direction indicator switch 20), whereas the negative signal value of direction indicator switch signal WS means a right turn (clockwise rotation of direction indicator switch 20). ECU 8 is also connected to a warning system 23 having a warning buzzer and/or a warning light, which comes on in response to an alarm signal AL from ECU 8, so that a visual and/or audible warning is signaled to the driver. Within ECU 8 when there is a possibility of the host vehicle's lane deviation, the central processing unit (CPU) allows the access by the I/O interface of input informational data signals from the previously-discussed engine/vehicle switches and sensors and camera controller 14 and driving torque control unit 12, and is responsible for carrying various control programs stored in the memories and capable of performing necessary arithmetic and logic operations. Computational results or arithmetic calculation results, in other words, calculated output signals or control command signals are relayed via the output interface circuitry to the output stages, for example, the solenoids of hydraulic modulator 7 and the warning buzzer/warning light of warning system 23.

Figure 2:
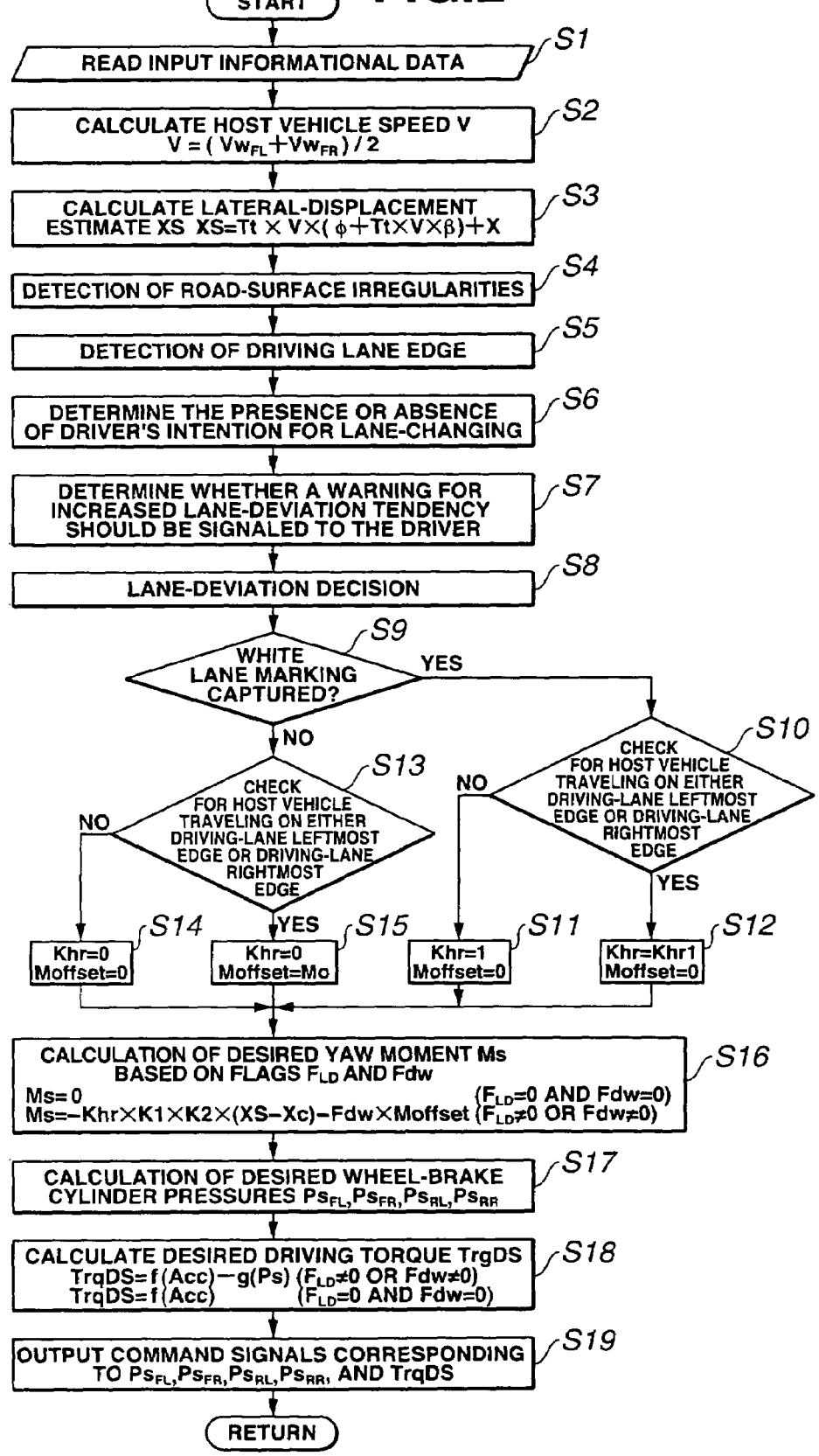
FIG. 2 is a flow chart showing a lane deviation prevention control routine executed by the LDP apparatus of the embodiment of FIG. 1.

The LDP control routine executed by ECU 8 incorporated in the automotive LDP apparatus of the embodiment shown in FIG. 1 is hereunder described in detail in reference to the flow chart shown in FIG. 2. The LDP control routine of FIG. 2 is executed as time-triggered interrupt routines to be triggered every predetermined sampling time intervals $\Delta T$ such as 20 milliseconds.

At step S1, input informational data from the previously-noted engine/vehicle switches and sensors, and driving-torque controller 12 and camera controller 14 are read. Concretely, read are engine/vehicle switch/sensor signal data, such as the host vehicle's longitudinal acceleration Xg, lateral acceleration Yg, yaw rate $\phi'$, wheel speeds Vwi ($Vw_{FL}$, $Vw_{FR}$, $Vw_{RL}$, $Vw_{RR}$), accelerator opening Acc, master-cylinder pressure Pm, steer angle $\delta$, and direction indicator switch signal WS, and signal data from driving-torque control unit 12 such as driving torque Tw, and signal data from camera controller 14 such as the host vehicle's yaw angle $\phi$ with respect to the direction of the current host vehicle's driving lane, lateral deviation (lateral displacement) X from the central axis of the current host vehicle's driving lane, curvature $\beta$ of the current driving lane, and the recognition signal regarding whether the white lane marking is detected by camera controller 14. The host vehicle's yaw angle $\phi$ may be calculated by integrating yaw rate $\phi'$ detected by yaw rate sensor 16. Additionally, at step S1, a check is made to determine whether the recognition signal from camera controller 14 indicates a state where the white lane marking line in front of the host vehicle is sufficiently satisfactorily detected. When the recognition signal from camera controller 14 indicates a state where the white lane marking line in front of the host vehicle is satisfactorily detected, a so-called recognition flag $F_{camready}$ is set to "1". Conversely when the recognition signal from camera controller 14 indicates a state where the white lane marking line in front of the host vehicle is not satisfactorily detected, recognition flag $F_{camready}$ is reset to "0".

At step S2, a host vehicle's speed V is calculated. Concretely, host vehicle speed V is calculated as a simple average value $(Vw_{FL}+Vw_{FR})/2$ of front-left and front-right wheel speeds $Vw_{FL}$ and $Vw_{FR}$ (corresponding to wheel speeds of driven road wheels 5FL and 5FR), from the expression $V=(Vw_{FL}+Vw_{FR})/2$. In lieu thereof, in case of an ABS system equipped vehicle, a pseudo vehicle speed used for skid control may be used as host vehicle speed V.

At step S3, a lateral-displacement estimate XS, in other words, an estimate of a future lateral deviation or an estimate of a future lateral displacement, is estimated or arithmetically calculated. Actually, lateral-displacement estimate XS is estimated or arithmetically calculated based on the latest up-to-date information concerning the host vehicle's yaw angle $\phi$ with respect to the direction of the current host vehicle's driving lane (in other words, the orientation of the host vehicle with respect to the direction of the current host vehicle's driving lane), lateral deviation X from the central axis of the current host vehicle's driving lane, curvature $\beta$ of the current host vehicle's driving lane, and the host vehicle's speed V ($=(Vw_{FL}+Vw_{FR})/2$), from the following expression (1).

$$XS=Tt\times V\times(\phi+Tt\times V\times\beta)+X \qquad (1)$$

where Tt denotes a headway time between the host vehicle and the preceding vehicle both driving in the same sense and in the same lane, and the product (Tt×V) of the headway time Tt and the host vehicle's speed V means a distance between the current position of the host vehicle and the forward point-of-fixation. That is, an estimate of lateral deviation from the central axis of the current host vehicle's driving lane, which may occur after the headway time Tt, is regarded as a future lateral-displacement estimate XS.

Figure 3A:
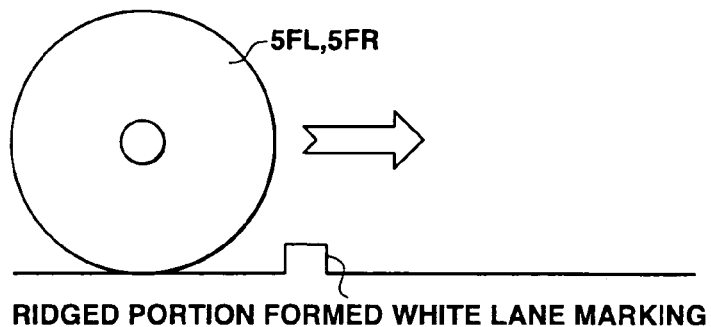
FIGS. 3A–3C are explanatory views showing wheel speed fluctuations and wheel acceleration fluctuations, occurring due to irregularities of the road surface.
Figure 3B:
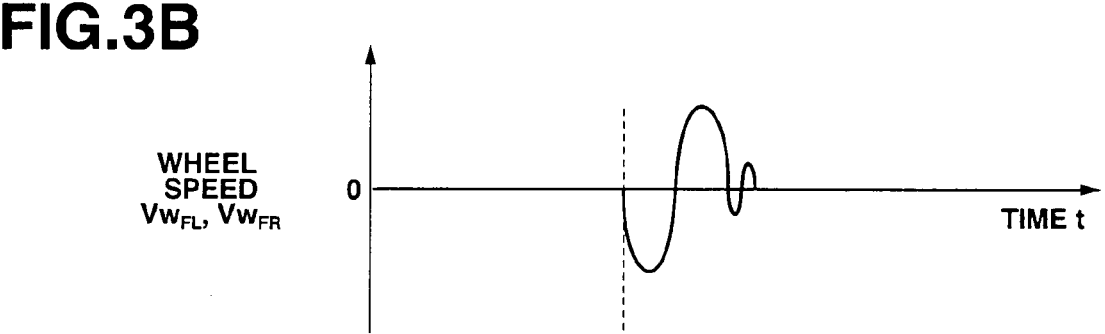
Figure 3C:
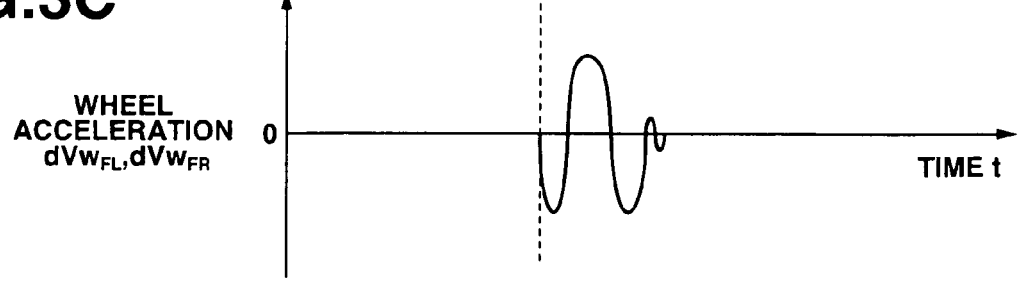

At step S4, a detection for predetermined road-surface irregularities, which are formed on the white lane marking line (the white lane marking), is made. In other words, a check is made to determine whether or not either one of front road wheels 5FL and 5FR of the host vehicle is traveling on predetermined road-surface irregularities, which are formed on the white lane marking. For instance, in order to warn or inform the driver of the lane-deviation tendency of the vehicle from the current driving lane, by way of vibratory motion input into the vehicle, such predetermined road-surface irregularities are generally equidistantly repeatedly formed on the white lane marking. As can be seen from the explanatory views of FIGS. 3A–3C, when either one of front road wheels 5FL and 5FR is traveling on the predetermined road-surface irregularities, equidistantly repeatedly formed on the white lane marking, front-left wheel speed $Vw_{FL}$ (or front-right wheel speed $Vw_{FR}$) tends to fluctuate at a substantially constant period or at a substantially constant oscillation frequency (see FIG. 3B). For the sake of simplicity, the presence of wheel speed fluctuations for only the front-left road wheel 5FL is hereinafter explained, because the arithmetic operations of step S4 are the same in the host vehicle's lane deviations to the left or to the right. That is, in order to detect or determine whether the host vehicle is traveling on the predetermined road-surface irregularities, a check is made to determine whether the front-left wheel speed $Vw_{FL}$ is fluctuating. Concretely, a front-left wheel acceleration/deceleration (simply, a front-left wheel acceleration) $dVw_{FL}$ is arithmetically calculated based on the latest up-to-date information concerning front-left wheel speed $Vw_{FL}$ read through step S1 from the following expression (2).

$$dVw_{FL}=Kg\times(Vw_{FL20}-Vw_{FL})/\Delta T \qquad (2)$$

where $Vw_{FL20}$ denotes the previous value of front-left wheel speed $Vw_{FL}$, calculated one cycle before (i.e., 20 milliseconds before), Kg denotes a unit conversion factor, and $\Delta T$ denotes a predetermined sampling time interval such as 20 milliseconds.

Figure 4:
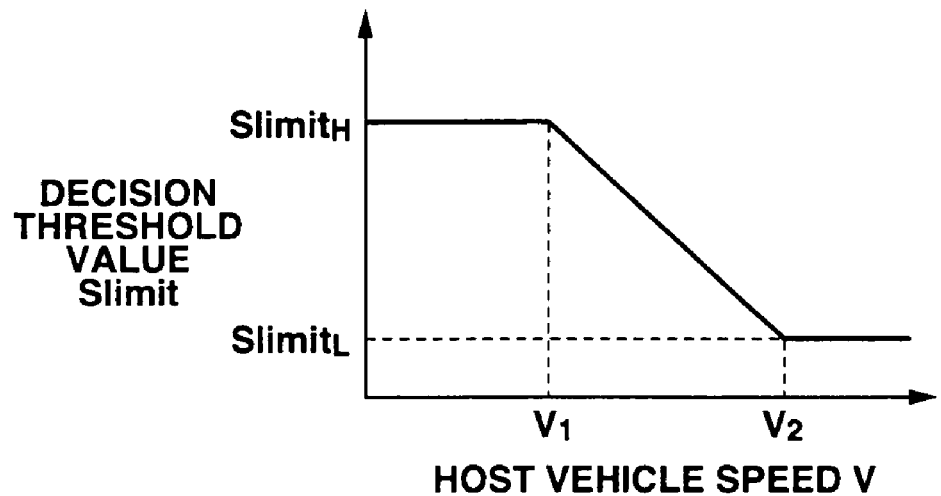
FIG. 4 is a predetermined host vehicle speed v decision threshold value Slimit characteristic map used for the LDP control routine of FIG. 2.
Figure 5:
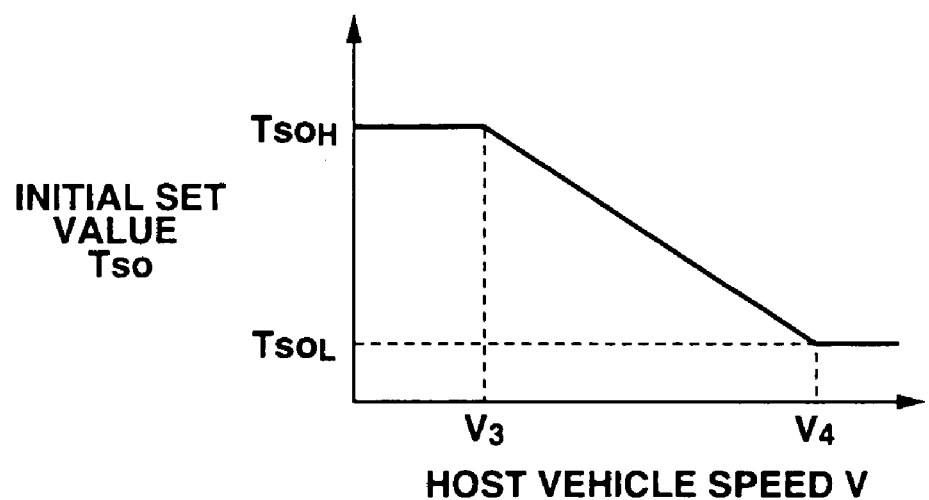
FIG. 5 is a predetermined host vehicle speed V versus initial set value Tso characteristic map used for the LDP control routine of FIG. 2.

At the same time, at step S4, a check is made to determine whether the calculated front-left wheel acceleration $dVw_{FL}$ becomes greater than a decision threshold value $S_{limit}$. When the calculated front-left wheel acceleration $dVw_{FL}$ becomes greater than decision threshold value $S_{limit}$, that is, when switching from the state defined by $dVw_{FL}\leq S_{limit}$ to the state defined by $dVw_{FL}>S_{limit}$ occurs, a further check is made to determine whether a predetermined time interval has expired from a time when front-left wheel speed $Vw_{FL}$ of front-left road wheel 5FL has been fluctuating one cycle before and thus the condition $dVw_{FL20}>S_{limit}$ has been satisfied. Actually, in the presence of switching from $dVw_{FL} \leq S_{limit}$ to $dVw_{FL}>S_{limit}$, as the further check, a count value $TS_{FL}$ of a count-down timer is compared to a predetermined value TsL. At this time, if the count value $TS_{FL}$ of the count-down timer is less than or equal to predetermined value TsL, that is, $TS_{FL} \leq TsL$, the count value $TS_{FL}$ of the count-down timer is set or initialized to an initial set value $T_{so}$, and additionally a road-surface irregularities estimation starting flag (simply, a road-surface estimation starting flag) $Frs_{FL}$ is set to "1". In the system of the embodiment, for the reasons discussed below, decision threshold value $S_{limit}$ is arithmetically calculated or map-retrieved as a variable based on host vehicle speed V, from the predetermined host vehicle speed V versus decision threshold value $S_{limit}$ characteristic map of FIG. 4 showing how a decision threshold value $S_{limit}$ has to be varied relative to a host vehicle speed V. As can be appreciated from the preprogrammed characteristic map of FIG. 4 showing the relationship between host vehicle speed V and decision threshold value $S_{limit}$, in a low vehicle speed range ($0 \leq V \leq V_1$) from 0 to a predetermined vehicle speed value $V_1$, decision threshold value $S_{limit}$ is fixed to a predetermined maximum threshold value $S_{limitH}$. In a middle vehicle speed range ($V1<V \leq V_2$) from predetermined low vehicle speed $V_1$ to a predetermined high vehicle speed $V_2$ (higher than $V_1$), decision threshold value $S_{limit}$ gradually reduces to a predetermined minimum threshold value $S_{limitL}$, as the host vehicle speed V increases. In an excessively high vehicle speed range ($V_2<V$) above predetermined high vehicle speed $V_2$, decision threshold value $S_{limit}$ is fixed to predetermined minimum threshold value $S_{limitL}$. On the other hand, initial set value $T_{so}$ of the count-down timer is arithmetically calculated or map-retrieved as a variable based on host vehicle speed V, from the predetermined host vehicle speed V versus initial set value $T_{so}$ characteristic map of FIG. 5 showing how an initial set value $T_{so}$ of the count-down timer has to be varied relative to a host vehicle speed V. As can be appreciated from the preprogrammed characteristic map of FIG. 5 showing the relationship between host vehicle speed V and initial set value $T_{so}$, in a low vehicle speed range ($0 \leq V \leq V_3$) from 0 to a predetermined vehicle speed value $V_3$, initial set value $T_{so}$ of the count-down timer is fixed to a predetermined maximum initial set value $T_{SOH}$. In a middle vehicle speed range ($V_3<V \leq V_4$) from predetermined low vehicle speed $V_3$ to a predetermined high vehicle speed $V_4$ (higher than $V_3$), initial set value $T_{so}$ gradually reduces to a predetermined minimum initial set value $T_{SOL}$, as the host vehicle speed V increases. In an excessively high vehicle speed range ($V_4<V$) above predetermined high vehicle speed $V_4$, initial set value $T_{so}$ is fixed to predetermined minimum initial set value $T_{SOL}$.

This is because the period of fluctuations of front-left wheel acceleration $dVw_{FL}$ and the amplitude of fluctuations of front-left wheel acceleration $dVw_{FL}$, in other words, the period of fluctuations of front-left wheel speed $Vw_{FL}$ and the amplitude of fluctuations of front-left wheel speed $Vw_{FL}$, both vary depending on host vehicle speed V. For instance, when front-left road wheel 5FL is traveling on the ridged portions (see FIG. 3A) equidistantly repeatedly formed on the white lane marking at a comparatively low vehicle speed, remarkable fluctuations of front-left wheel speed $Vw_{FL}$ (or remarkable fluctuations of front-left wheel acceleration $dVw_{FL}$) occur for every ridge portions formed on the white lane marking. Conversely when front-left road wheel 5FL is traveling on the ridge portions formed on the white lane marking at a comparatively high vehicle speed, remarkable fluctuations of front-left wheel speed $Vw_{FL}$ (or remarkable fluctuations of front-left wheel acceleration $dVw_{FL}$) do not occur for every ridge portions formed on the white lane marking. That is to say, in case of high host vehicle speeds V, the host vehicle is greatly affected by the tire characteristics and suspension characteristics, and thus the period of fluctuations of front-left wheel speed $Vw_{FL}$ tends to increase, whereas the amplitude of fluctuations of front-left wheel speed $Vw_{FL}$ tends to decrease. For the reasons discussed above, on the basis of predetermined V-$S_{limit}$ characteristic of FIG. 4, decision threshold value $S_{limit}$ is fixed to predetermined maximum threshold value $S_{limitH}$ in the low vehicle speed range ($0 \leq V \leq V_1$), and fixed to predetermined minimum threshold value $S_{limitL}$ in the excessively high vehicle speed range ($V_2<V$), and gradually reduces to predetermined minimum threshold value $S_{limitL}$ in a linear fashion as the host vehicle speed V increases in the middle vehicle speed range ($V_1<V \leq V_2$). In a similar manner, on the basis of predetermined V-$T_{so}$ characteristic of FIG. 5, count-down-timer initial set value $T_{so}$ is fixed to predetermined maximum initial set value $T_{SOH}$ in the low vehicle speed range ($0 \leq V \leq V_3$), and fixed to predetermined minimum initial set value $T_{SOL}$ in the excessively high vehicle speed range ($V_4<V$), and gradually reduces to predetermined minimum initial set value $T_{SOL}$ in a linear fashion as the host vehicle speed V increases in the middle vehicle speed range ($V_3<V \leq V_4$).

Figure 6:
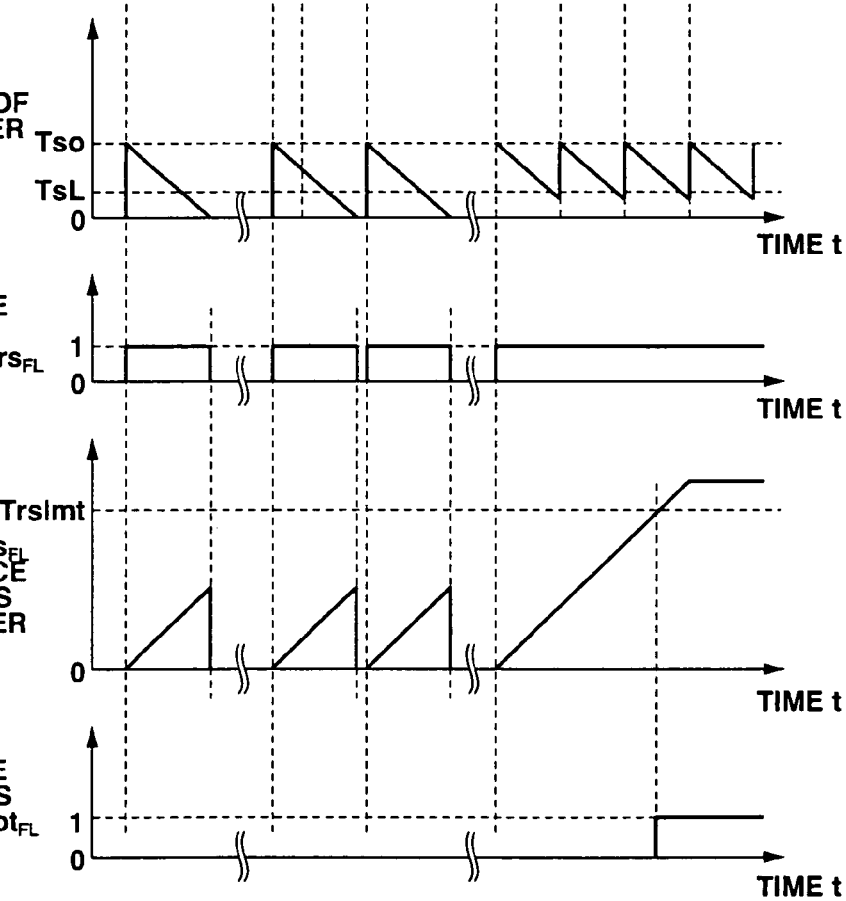
FIGS. 6A–6E are time charts explaining control actions performed by the apparatus of the embodiment executing the LDP control routine shown in FIG. 2.

Conversely when the count value $TS_{FL}$ of the count-down timer is greater than predetermined value TsL, the count value $TS_{FL}$ of the count-down timer is decremented by a predetermined value, while a count value $Trs_{FL}$ of a road-surface irregularities estimation timer is incremented by the predetermined value (see FIGS. 6B and 6D). If the count value $TS_{FL}$ of the count-down timer is less than or equal to "0", road-surface estimation starting flag $Frs_{FL}$ is reset to "0" and additionally the count value $Trs_{FL}$ of the road-surface irregularities estimation timer is reset to "0".

Conversely when the current value $dVw_{FL}$ of front-left wheel acceleration, calculated at the current control cycle, is less than or equal to decision threshold value $S_{limit}$, that is, the condition $dVw_{FL}>S_{limit}$ is unsatisfied, or when the previous value $dVw_{FL20}$ of front-left wheel acceleration, calculated one cycle before, is greater than decision threshold value $S_{limit}$, that is, the condition $dVw_{FL20}>S_{limit}$ is satisfied, the count value $TS_{FL}$ of the count-down timer is decremented by the predetermined value, while the count value $Trs_{FL}$ of the road-surface irregularities estimation timer is incremented by the predetermined value. If the count value $TS_{FL}$ of the count-down timer is less than or equal to "0", road-surface estimation starting flag $Frs_{FL}$ is reset to "0" and additionally the count value $Trs_{FL}$ of the road-surface irregularities estimation timer is reset to "0".

With the previously-noted arrangement, as can be seen from the time period C of each of the time charts of FIGS. 6A–6E, when front-left wheel acceleration $dVw_{FL}$ becomes greater than decision threshold value $S_{limit}$ (see the time period C of the time chart of FIG. 6A) the count value $Ts_{FL}$ of the count-down timer is initialized to initial set value $T_{so}$ and then gradually decremented (see the time period C of the time chart of FIG. 6B). On the other hand, the count value $Trs_{FL}$ of the road-surface irregularities estimation timer is gradually incremented (see the time period C of the time chart of FIG. 6D). Thereafter, if front-left wheel acceleration $dVw_{FL}$ becomes greater than decision threshold value $S_{limit}$ again during a time interval from the time when the count value $Ts_{FL}$ of the count-down timer becomes less than or equal to predetermined value TsL to the time when the count value $Ts_{FL}$ of the count-down timer becomes less than or equal to "0", that is, when front-left wheel speed $Vw_{FL}$ tends to increase at a substantially constant time period (Tso-TsL), the count value $Ts_{FL}$ of the count-down timer is set again to initial set value $T_{so}$. As a result of this, as can be seen from the time period C of the time chart of FIG. 6D, the count value $Trs_{FL}$ of the road-surface irregularities estimation timer continues to increase (see the relationship between the road-surface estimation starting flag $Frs_{FL}$ and the count value $Trs_{FL}$ of the road-surface irregularities estimation timer in FIGS. 6C and 6D). On the contrary, as can be seen from the time periods A and B of each of the time charts of FIGS. 6A–6E, when the host vehicle momentarily stamps across an obstacle (e.g., a stone) fallen into the road surface or a protruding portion on the road and thus front-left wheel speed $Vw_{FL}$ temporarily greatly changes and fluctuates (see the time periods A and B of the time chart of FIG. 6A), the count value $Ts_{FL}$ of the count-down timer is temporarily set to initial set value $T_{so}$, and then gradually reduces down to "0", and finally becomes "0" (see the time periods A and B of the time chart of FIG. 6B). As a result of this, the count value $Trs_{FL}$ of the road-surface irregularities estimation timer, gradually increasing, becomes "0" immediately when the count value $Ts_{FL}$ of the count-down timer becomes "0" (see the time periods A and B of each of the time charts of FIGS. 6B and 6D).

Thereafter, another check is made to determine whether the count value $Trs_{FL}$ of the road-surface irregularities estimation timer is greater than a predetermined decision threshold value Trslmt. When the count value $Trs_{FL}$ of the road-surface irregularities estimation timer is greater than a predetermined decision threshold value Trslmt ($Trs_{FL}$>Trslmt), a road-surface irregularities decision flag $Fot_{FL}$ is set to "1" (see the time period C of each of the time charts of FIGS. 6D and 6E). Setting of road-surface irregularities decision flag $Fot_{FL}$ to "1" means that front-left road wheel 5FL is now traveling on the predetermined irregularities (corresponding to the ridge portions exemplified in FIG. 3A) equidistantly repeatedly formed on the white lane marking. Conversely when the count value $Trs_{FL}$ of the road-surface irregularities estimation timer is less than or equal to predetermined decision threshold value Trslmt ($Trs_{FL}$≦Trslmt), road-surface irregularities decision flag $Fot_{FL}$ remains reset to "0" (see the time periods A and B of each of the time charts of FIGS. 6D and 6E).

As discussed previously, according to the LDP control system of the embodiment, when the front wheel speed $Vw_{FL}$ (or $Vw_{FR}$) of either one of front road wheels 5FL and 5FR is fluctuating or changing at a substantially constant time period ($T_{so}$-TsL), road-surface irregularities decision flag $Fot_{FL}$ is set ($Fot_{FL}$=1). Therefore, only when either front-left road wheel 5FL or front-right road wheel 5FR is traveling on predetermined road-surface irregularities, which are equidistantly repeatedly formed on the white lane marking, the system determines that the host vehicle is running on the predetermined road-surface irregularities formed on the white lane marking. Suppose that road-surface irregularities decision flag $Fot_{FL}$ is set ($Fot_{FL}$=1) when the front wheel speed $Vw_{FL}$ (or $Vw_{FR}$) of the host vehicle is merely fluctuating but not changing at a substantially constant period ($T_{so}$-TsL). In such a way to set the road-surface irregularities decision flag $Fot_{FL}$, even when the host vehicle merely stamps across a protruding portion on the road, road-surface irregularities decision flag $Fot_{FL}$ may be undesirably set to "1". As a result, there is a possibility that the system erroneously determines that the host vehicle is traveling on the predetermined road-surface irregularities formed on the white lane marking, in particular during the host vehicle's driving on bad roads such as rugged terrain.

At step S5, a first check is made to determine whether the host vehicle is traveling on either one of the leftmost and rightmost edges of the current driving lane. Concretely, a check is made to determine whether either one of road-surface irregularities decision flag $Fot_{FL}$ associated with front-left road wheel 5FL and road-surface irregularities decision flag $Fot_{FR}$ associated with front-right road wheel 5FR is set to "1". When either one of road-surface irregularities decision flag $Fot_{FL}$ for front-left road wheel 5FL and road-surface irregularities decision flag $Fot_{FR}$ for front-right road wheel 5FR is set to "1", a second check is made to determine whether road-surface irregularities decision flag $Fot_{FL}$ for front-left road wheel 5FL is set to "1". When the answer to the second check is in the affirmative, that is, either one of flags $Fot_{FL}$ and $Fot_{FR}$ is set to "1" and road-surface irregularities decision flag $Fot_{FL}$ for front-left road wheel 5FL is set (=1), a road-edge decision flag (or a driving-lane edge decision flag) Fdw is set to "1". Setting of road-edge decision flag Fdw to "1" (exactly, "+1") means that the host vehicle is now traveling on the left-hand edge of its driving lane. Conversely when the answer to the second check is in the negative, that is, either one of flags $Fot_{FL}$ and $Fot_{FR}$ is set to "1" and road-surface irregularities decision flag $Fot_{FR}$ for front-right road wheel 5FR is set (=1), road-end decision flag Fdw is set to "−1". Setting of road-end decision flag Fdw to "−1" means that the host vehicle is now traveling on the right-hand edge of its driving lane.

In contrast to the above, when road-surface irregularities decision flag $Fot_{FL}$ for front-left road wheel 5FL and road-surface irregularities decision flag $Fot_{FR}$ for front-right road wheel 5FR are both set to "1", or when flags $Fot_{FL}$ and $Fot_{FR}$ are both reset to "0", road-edge decision flag Fdw is reset to "0".

As explained previously, according to the system of the embodiment, only when either one of road-surface irregularities decision flag $Fot_{FL}$ for front-left road wheel 5FL and road-surface irregularities decision flag $Fot_{FR}$ for front-right road wheel 5FR is set to "1", road-edge decision flag Fdw is set (=+1 or −1). Thus, only when either one of front-left and front-right road wheels 5FL and 5FR of the host vehicle is traveling and stamping across the irregularities of the road surface, the system determines that the host vehicle is running on the predetermined road-surface irregularities, equidistantly repeatedly formed on the white lane marking.

At step S6, a check is made to determine, based on direction indicator switch signal WS from direction indicator switch 20 and steer angle δ detected by steer angle sensor 19, whether a driver's intention for lane changing is present or absent. Concretely, at step S6, a check is made to determine whether direction indicator switch 20 is turned ON. When direction indicator switch 20 is turned ON, a further check is made to determine whether the sign of direction indicator switch signal WS is identical to the sign of lateral-displacement estimate XS calculated through step S3. When the sign of direction indicator switch signal WS and the sign of lateral-displacement estimate XS are identical to each other, the processor of ECU 8 determines that the host vehicle is conditioned in the lane changing state, and thus a lane-changing indicative flag $F_{LC}$ is set to "1". Conversely when the sign of direction indicator switch signal WS and the sign of lateral-displacement estimate XS are not identical to each other, the processor of ECU 8 determines that the host vehicle is not conditioned in the lane changing state but there is an increased tendency of the host vehicle's lane deviation, and thus lane-changing indicative flag $F_{LC}$ is reset to "0". Actually, lane-changing indicative flag $F_{LC}$ is held at "1" for a predetermined time interval, such as four seconds, from the time when lane-changing indicative flag $F_{LC}$ has been set to "1" by turning the direction indicator switch 20 ON. This is because there is a possibility that direction indicator switch 20 is manually turned OFF during lane-changing and thus the LDP control may be engaged undesirably. More concretely, a check is made to determine whether direction indicator switch 20 has been switched from the turned-ON state to the turned-OFF state. When switching from the turned-ON state to turned-OFF state has occurred, ECU 8 determines that the current point of time corresponds to the time just after lane-changing operation, and thus a further check is made to determine whether the predetermined time interval, for example four seconds, measured or counted from the time when switching from the turned-ON state of direction indicator switch 20 to turned-OFF state has occurred, has expired. When the predetermined time interval (e.g., 4 seconds) has expired, lane-changing indicative flag $F_{LC}$ is reset to "0".

Taking into account the driver's steering operation under a condition that direction indicator switch 20 remains turned OFF, a still further check for the presence or absence of the driver's intention for lane changing is made based on steer angle $\delta$ and a variation $\Delta\delta$ in steer angle $\delta$. Concretely, with direction indicator switch 20 turned OFF, a check is made to determine whether steer angle $\delta$ is greater than or equal to a predetermined steer angle $\delta_s$ and additionally a variation $\Delta\delta$ in steer angle $\delta$ is greater than or equal to a predetermined change $\Delta\delta_s$. In case of $\delta \geq \delta_s$ and $\Delta\delta \geq \Delta\delta_s$, ECU 8 determines that a driver's intention for lane changing is present, and thus lane-changing indicative flag $F_{LC}$ is set to "1". Conversely in case of $\delta < \delta_s$ or $\Delta\delta < \Delta\delta_s$, ECU 8 determines that a driver's intention for lane changing is absent, and thus lane-changing indicative flag $F_{LC}$ is reset to "0". Thereafter, the routine proceeds from step S6 to step S7 (described later). As discussed above, in the shown embodiment, the presence or absence of the driver's intention for lane changing is determined based on both of steer angle $\delta$ and its change $\Delta\delta$. In lieu thereof, the presence or absence of the driver's intention for lane changing may be determined based on the magnitude of steering torque acting on the steering wheel.

At step S7, a check is made to determine, based on the absolute value |XS| of lateral-displacement estimate XS (exactly, a comparison result of lateral-displacement estimate absolute value |XS| and a predetermined alarm criterion $X_w$) and setting or resetting of lane-changing indicative flag $F_{LC}$, whether a visual and/or audible warning for the increased host vehicle's lane-deviation tendency should be signaled to the driver. Concretely, a check is made to determine whether lane-changing indicative flag $F_{LC}$ is reset to "0" and additionally the absolute value |XS| of lateral-displacement estimate XS is greater than or equal to predetermined alarm criterion $X_w$ (exactly, a predetermined alarm criterion threshold value). Predetermined alarm criterion $X_w$ is obtained by subtracting a predetermined margin $X_m$ (a predetermined constant) from a predetermined lateral-displacement criterion $X_c$ (see the following expression (3)).

$$X_w = X_c - X_m \tag{3}$$

where predetermined lateral-displacement criterion $X_c$ means a preset criterion threshold value of lateral displacement of the host vehicle from the central axis of the current host vehicle's driving lane, and predetermined margin $X_m$ corresponds to a margin from a time when warning system 23 has been switched to an operative state to a time when the LDP function has been engaged or enabled. For instance, predetermined lateral-displacement criterion $X_c$ is set to 0.8 meter, since a width of a traffic lane of an express-highway in Japan is 3.35 meters. In case of $F_{LC}=0$ and $|XS| \geq X_w$, ECU 8 determines that the host vehicle is in a lane-deviation state where there is an increased tendency for the host vehicle to deviate from the current host vehicle's driving lane, and thus the output interface of ECU 8 generates alarm signal AL to warning system 23. On the contrary, in case of $F_{LC}=1$ or $|XS|<X_w$, ECU 8 determines that the host vehicle is out of the lane-deviation state, and thus another check is made to determine whether or not warning system 23 is in operation. During operation of warning system 23, another check is made to determine whether the absolute value |XS| of lateral-displacement estimate XS is less than a difference $(X_w-X_h)$ between predetermined alarm criterion $X_w$ and a predetermined hysteresis $X_h$. Predetermined hysteresis $X_h$ is provided to avoid undesirable hunting for warning system 23. In case of $|XS|<(X_w-X_h)$, warning system 23 is deactivated by stopping the output of alarm signal AL to warning system 23. That is to say, until the lateral-displacement estimate XS is transferred to the state defined by $|XS|<(X_w-X_h)$ after warning system 23 has been activated, the warning operation of warning system 23 is continually executed. In the system of the shown embodiment, the visual and/or audible warning (the output of alarm signal AL to warning system 23) is dependent upon only the amount of lateral displacement or lane deviation (exactly, the absolute value |XS| of lateral-displacement estimate XS). In the LDP control system of the embodiment shown in FIGS. 1 and 2, predetermined lateral-displacement criterion $X_c$ is fixed to a predetermined constant value. Actually, a lane width L of each of driving lanes is not fixed constant. Thus, predetermined lateral-displacement criterion $X_c$ may be a variable, which is determined depending on lane width L of each of driving lanes. For instance, the lane width L itself can be obtained by image-processing the picture image data from CCD camera 13 or by extracting input information regarding the lane width of the current driving lane as map data, utilizing a navigation system. In this case, predetermined lateral-displacement criterion $X_c$, which is a variable, can be calculated from the following expression (4).

$$X_c = \min\{(L/2 - Lc/2), 0.8\} \tag{4}$$

where Lc denotes a host vehicle's width and L denotes a lane width. As can be appreciated from the above expression (4), predetermined lateral-displacement criterion $X_c$ is obtained as a lower one of the value (L/2−Lc/2) and 0.8(unit:meter) by way of a so-called select-LOW process.

In lieu thereof, in case of an automated highway equipped with an infrastructure, a distance data (L/2−XS), which is obtained and received by way of mutual communication between the host vehicle and the on-road network (or the on-road sensor or the on-road lane marker) contained in the infrastructure, may be used as input information regarding an estimate of predetermined lateral-displacement criterion $X_c$. Subsequently to step S7, step S8 occurs.

At step S8, the processor of ECU 8 makes a lane-deviation decision based on the picture image data concerning the white lane marking in front of the host vehicle, in other words, a comparison result between lateral-displacement estimate XS and predetermined lateral-displacement criterion $X_c$, so as to determine whether there is a possibility or an increased tendency of lane deviation of the host vehicle from the current driving lane. Concretely, at step S8, a check is made to determine whether lateral-displacement estimate XS is greater than or equal to predetermined lateral-displacement criterion $X_c$ (a positive lane-deviation criterion). In case of $XS \geq X_c$, the processor of ECU 8 determines that there is an increased tendency for the host vehicle to deviate from the current driving lane to the left, and thus a lane-deviation decision flag $F_{LD}$ is set to "+1". In case of $XS<X_c$, another check is made to determine whether lateral-displacement estimate XS is less than or equal to a negative value $-X_c$ of predetermined lateral-displacement criterion $X_c$. In case of $XS \geq -X_c$, the processor of ECU 8 determines that there is an increased tendency for the host vehicle to deviate from the current driving lane to the right, and thus lane-deviation decision flag $F_{LD}$ is set to "−1". Alternatively, when the [condition] conditions defined by $XS \geq X_c$ and $XS \leq -X_c$ are both unsatisfied, that is, in case of $-X_c<XS<X_c$, the processor of ECU 8 determines that there is a less possibility of the host vehicle's lane deviation from the current driving lane to the right or to the left, and thus lane-deviation decision flag $F_{LD}$ is reset to "0".

Thereafter, a further check is made to determine whether lane-changing indicative flag $F_{LC}$ is set to "1". In case of $F_{LC}=1$, lane-deviation decision flag $F_{LD}$ is forcibly reset to "0", even under the condition defined by the inequality $|XS| \geq X_c$. In case of $F_{LC}=0$, a check is made to determine whether lane-deviation decision flag $F_{LD}$ is reset to "0". When lane-deviation decision flag $F_{LD}$ is reset ($F_{LD}=0$), an LDP control canceling flag or an LDP control inhibiting flag $F_{cancel}$ is reset to "0". In case of $F_{LD}=+1$ or −1, a check is made to determine whether the LDP control should be initiated. Actually, historical data of lateral-displacement estimate XS, calculated through step S3, are stored in predetermined memory addresses of the RAM of ECU 8. Then, the continuity or discontinuity of lateral-displacement estimate XS is determined based on the historical data of lateral-displacement estimate XS. Concretely, a check is made to determine whether the absolute value $|XS_{(n-1)}-XS_{(n)}|$ of the difference between the previous value $XS_{(n-1)}$ of lateral-displacement estimate XS and the current value $XS_{(n)}$ of lateral-displacement estimate XS is greater than or equal to a predetermined threshold value $L_{xs}$, which is provided to determine the continuity or discontinuity of lateral-displacement estimate XS. More concretely, in case of $F_{LD} \neq 0$ (i.e., $F_{LD}=+1$ or −1) and $|XS_{(n-1)}-XS_{(n)}| \geq L_{xs}$, ECU 8 determines that lateral-displacement estimate XS is discontinuous and thus LDP control inhibiting flag $F_{cancel}$ is set to "1". Conversely, in case of $|XS_{(n-1)}-XS_{(n)}|<L_{xs}$, ECU 8 determines that lateral-displacement estimate XS is continuous. LDP control inhibiting flag $F_{cancel}$ is reset to "0" when lane-deviation decision flag $F_{LD}$ is switched to "0". In other words, LDP control inhibiting flag $F_{cancel}$ is maintained at "0", until lane-deviation decision flag $F_{LD}$ is transferred from the state of $F_{LD} \neq 0$ to the state of $F_{LD}=0$.

As discussed previously, in case of $F_{LC}=1$, lane-deviation decision flag $F_{LD}$ is forcibly reset to "0", even under the condition defined by the inequality $|XS| \geq X_c$. In a similar manner, when a tire grip on the road reaches a limit, in other words, during skid control, during traction control, or during vehicle dynamics control, the LDP control has to be generally inhibited. Thus, during skid control, during traction control, or during vehicle dynamics control, lane-deviation decision flag $F_{LD}$ is also forcibly reset to "0", even under the condition defined by the inequality $|XS| \geq X_c$.

As set forth above, according to the system of the embodiment, basically, under the condition defined by the inequality $|XS| \geq X_c$, lane-deviation decision flag $F_{LD}$ is switched to the set state, that is, $F_{LD}=+1$ (indicative of the host vehicle's lane-deviation tendency to the left) or $F_{LD}=-1$ (indicative of the host vehicle's lane-deviation tendency to the right). Thus, it is possible to properly precisely detect or determine whether there is an increased tendency for the host vehicle to deviate from the current driving lane.

At step S9, a check is made to determine whether camera controller 14 captures and recognizes the white lane marking (the white lane line) in front of the host vehicle. Concretely, a check is made to determine whether or not recognition flag $F_{camready}$, determined through step S1, is set to "1". When recognition flag $F_{camready}$ is set (=1), the routine proceeds from step S9 to step S10. Conversely when recognition flag $F_{camready}$ is reset (=0), the routine proceeds from step S9 to step S13.

At step S10, a check is made to determine whether the host vehicle is running on the driving-lane leftmost edge or on the driving-lane rightmost edge. Concretely, a check is made to determine whether road-edge decision flag Fdw, determined through step S5, is set to "+1" or "−1". When the answer is affirmative (YES), that is, in case of Fdw=+1 or Fdw=−1, the routine proceeds from step S10 to step S12. Conversely when the answer is negative (NO), that is, in case of Fdw=0, the routine proceeds from step S10 to step S11.

At step S11, a control gain Khr, which is used to arithmetically calculate a desired yaw moment Ms (described later in reference to an expression (5) and corresponds to a controlled variable of LDP control), is set to "1". At the same time, a controlled-variable offset $M_{offset}$, which is used to arithmetically calculate desired yaw moment Ms, is set to "0". Thereafter, the routine shifts from step S11 to step S16.

At step S12, control gain Khr is set to a predetermined gain (a relatively great gain) Khr1 (>1) and additionally controlled-variable offset $M_{offset}$ is set to "0". Thereafter, the routine shifts from step S12 to step S16.

At step S13, in the same manner as step S10, a check is made to determine whether the host vehicle is running on the driving-lane leftmost edge or on the driving-lane rightmost edge. Concretely, a check is made to determine whether road-edge decision flag Fdw, determined through step S5, is set to "+1" or "−1". When the answer is affirmative (YES), that is, in case of Fdw=+1 or Fdw=−1, the routine proceeds from step S13 to step S15. Conversely when the answer is negative (NO), that is, in case of Fdw=0, the routine proceeds from step S13 to step S14.

At step S14, control gain Khr is set to "0", and simultaneously controlled-variable offset $M_{offset}$ is also set to "0". Thereafter, the routine shifts from step S14 to step S16.

At step S15, control gain Khr is set to "0", and simultaneously controlled-variable offset $M_{offset}$ is set to a predetermined constant value Mo, so as to execute lane-keeping (LK) control. Thereafter, the routine shifts from step S15 to step S16. Predetermined constant value Mo is determined in such a manner as to provide a moderate change of host vehicle's dynamic behavior (yawing motion) rather than a quick change of vehicle dynamic behavior. The vehicle dynamic behavior is determined based on the desired yaw moment Ms (calculated through step S16 described later).

As discussed above, according to the system of the embodiment, when the condition defined by $F_{camready}=0$ and the condition defined by Fdw=+1 or Fdw=−1 are both satisfied, in other words, when the picture image data in front of the host vehicle and captured by the CCD camera never indicates the increased lane-deviation tendency of the host vehicle, but the predetermined road-surface irregularities detection system detects that either one of front road wheels 5FL and 5FR of the host vehicle is traveling on the predetermined road-surface irregularities, which are formed on the white lane marking, controlled-variable offset $M_{offset}$ can be set to predetermined constant value Mo. This eliminates any unnatural feeling that the driver experiences uncomfortable fluctuations of dynamic vehicle behavior, such as a yaw rate and a sideslip angle.

Figure 7:
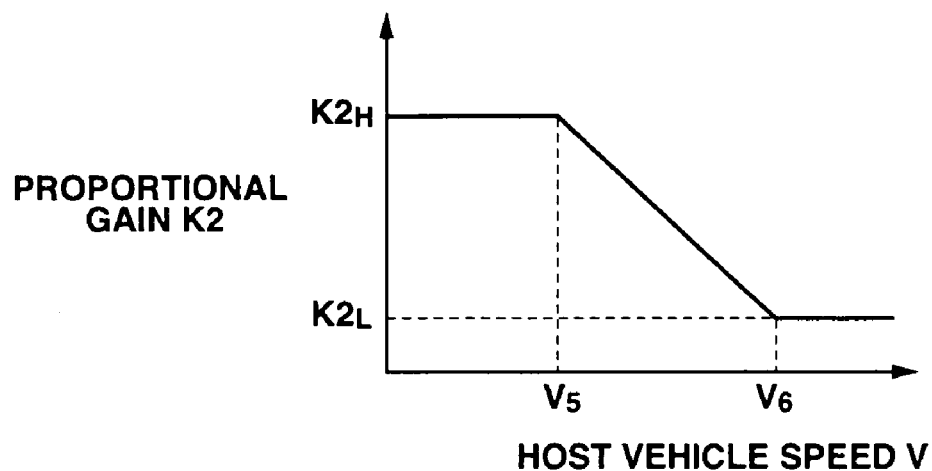
FIG. 7 is a predetermined host vehicle speed v proportional gain K2 characteristic map used for the LDP control routine of FIG. 2.

At step S16, desired yaw moment Ms is arithmetically calculated. Concretely, a check is made to determine whether the condition defined by $F_{LD}\neq 0$ (that is, $F_{LD}$=+1 or −1) or Fdw≠0 (that is, Fdw=+1 or −1) is satisfied. When the condition defined by $F_{LD}\neq 0$ (that is, $F_{LD}$=+1 or −1) or Fdw≠0 (that is, Fdw=+1 or −1) is satisfied, that is, when there is an increased tendency for the host vehicle to deviate from the driving lane or when the host vehicle is running on the driving-lane leftmost edge or on the driving-lane rightmost edge, desired yaw moment Ms is arithmetically calculated from the following expression (5). Conversely when the condition defined by $F_{LD}\neq 0$ (that is, $F_{LD}$=+1 or −1) or Fdw≠0 (that is, Fdw=+1 or −1) is unsatisfied, in other words, when the condition defined by $F_{LD}$=0 and Fdw=0 is satisfied, desired yaw moment Ms is set to "0".

$$Ms = -Khr \times K1 \times K2 \times (XS-X_c) - Fdw \times M_{offset} \qquad (5)$$

where K1 denotes a proportional gain that is determined by specifications of the host vehicle, K2 denotes a proportional gain that is determined by host vehicle speed V and retrieved based on host vehicle speed V from the predetermined host vehicle speed V versus proportional gain K2 characteristic map of FIG. 7 showing how a proportional gain K2 has to be varied relative to a host vehicle speed V, and Khr denotes the control gain determined through steps S10–S15. In the shown embodiment, as can be appreciated from the preprogrammed characteristic map of FIG. 7 showing the relationship between host vehicle speed V and proportional gain K2, in a low vehicle speed range ($0<V \leq V_5$) from 0 to a predetermined vehicle speed value $V_5$, proportional gain K2 is fixed to a predetermined maximum gain $K2_H$. In a middle vehicle speed range ($V_5<V \leq V_6$) from predetermined low vehicle speed $V_5$ to a predetermined high vehicle speed $V_6$ (higher than $V_5$), proportional gain K2 gradually reduces to a predetermined minimum gain $K2_L$, as the host vehicle speed V increases. In an excessively high vehicle speed range ($V_6<V$) above predetermined high vehicle speed $V_6$, proportional gain K2 is fixed to predetermined minimum gain $K2_L$.

As discussed above, according to the system of the embodiment, when lane-deviation decision flag $F_{LD}$ is kept at the set state, that is, in case of $F_{LD}\neq 0$ (that is, $F_{LD}$=+1 or −1), the system calculates desired yaw moment Ms by which the host vehicle's lane deviation is avoided. As soon as the host vehicle's increased lane-deviation tendency is detected, a proper yaw moment can be produced at an earlier timing in a direction that the host vehicle's lane-deviation tendency is avoided. This certainly prevents the host vehicle from deviating from the driving lane. At this time, as can be seen from the aforementioned expression (5), desired yaw moment Ms can be arithmetically calculated based on the difference ($XS-X_c$) between lateral-displacement estimate (the estimate of the future lateral deviation) XS and predetermined lateral-displacement criterion $X_c$. Thus, it is possible to produce a proper yaw moment, which is determined based on the difference ($XS-X_c$), thereby more certainly preventing the host vehicle from deviating from its driving lane. Subsequently to step S16, step S17 occurs.

At step S17, front-left, front-right, rear-left, and rear-right desired wheel-brake cylinder pressures $Ps_{FL}$, $Ps_{FR}$, $Ps_{RL}$ and $Ps_{RR}$, which are collectively referred to as "Psi", are calculated based on master cylinder pressure Pm read through step S1 and desired yaw moment Ms determined through step S16.

Concretely, in case of $F_{LD}$=0 (whose lane-deviation decision flag $F_{LD}$ setting or resetting state is determined through step S3) and Fdw=0 (whose road-edge decision flag Fdw setting or resetting state is determined through step S5), that is, when there is a less tendency for the host vehicle to deviate from the driving lane and the host vehicle is not traveling on the predetermined road-surface irregularities, equidistantly repeatedly formed on the white lane marking, exactly, on the driving-lane leftmost edge or on the driving-lane rightmost edge, front-left and front-right desired wheel-brake cylinder pressures $Ps_{FL}$ and $Ps_{FR}$ for front wheel-brake cylinders 6FL and 6FR are set to master-cylinder pressure Pm (see the following expressions), whereas rear-left and rear-right desired wheel-brake cylinder pressures $Ps_{RL}$ and $Ps_{RR}$ for rear wheel-brake cylinders 6RL and 6RR are set to a rear-wheel brake pressure or a rear-wheel master-cylinder pressure PmR (see the following expressions), which is calculated and usually reduced from master-cylinder pressure Pm, while taking into account wheel-brake cylinder pressure distribution between front and rear wheel brakes.

$Ps_{FL}$=Pm
$Ps_{FR}$=Pm
$Ps_{RL}$=PmR
$Ps_{RR}$=PmR

In contrast to the above, during operation of the LDP control system (in case of $F_{LD}\neq 0$, that is, $F_{LD}$=+1 or $F_{LD}$=−1) or in the set state of road-edge decision flag Fdw (in case of Fdw≠0, that is, Fdw=+1 or Fdw=−1), in other words, when there is an increased tendency for the host vehicle to deviate from the driving lane or when the host vehicle is traveling on either the driving-lane leftmost edge or the driving-lane rightmost edge, each of desired front and rear wheel-brake cylinder pressures $Ps_{FL}$, $Ps_{FR}$, $Ps_{RL}$ and $Ps_{RR}$ is calculated based on the magnitude of desired yaw moment Ms. Concretely, when the absolute value |Ms| of desired yaw moment Ms is less than a predetermined desired yaw-moment threshold value Ms1, (i.e., |Ms|<Ms1), the processor of ECU 8 determines each of desired wheel-brake cylinder pressures $Ps_{FL}$ through $Ps_{RR}$ in such a manner as to provide only the differential pressure between rear road wheels 5RL and 5RR. In other words, the differential pressure between front road wheels 5FL and 5FR is set to "0". Thus, in case of |MS|<MS1, the front desired wheel-brake cylinder pressure difference $\Delta Ps_F$ between front-left and front-right desired wheel-brake cylinder pressures $Ps_{FL}$ and $Ps_{FR}$, and the rear desired wheel-brake cylinder pressure difference $\Delta Ps_R$ between rear-left and rear-right desired wheel-brake cylinder pressures $Ps_{RL}$ and $Ps_{RR}$ are determined as follows.

$$\Delta Ps_F = 0 \qquad (6)$$

$$\Delta Ps_R = 2 \times Kb_R \times |Ms|/T$$

where $Kb_R$ denotes a predetermined conversion coefficient used to convert a rear-wheel braking force into a rear wheel-brake cylinder pressure and T denotes a rear-wheel tread (or a rear-wheel track). In the shown embodiment, the rear-wheel track T is set to be identical to a front-wheel track.

Conversely when the absolute value |Ms| of desired yaw moment Ms is greater than or equal to predetermined threshold value Ms1, (i.e., |Ms|≧Ms1), the processor of ECU 8 determines each of desired wheel-brake cylinder pressures $Ps_{FL}$ through $Ps_{RR}$ in such a manner as to provide both of the differential pressure between front road wheels 5FL and 5FR and the differential pressure between rear road wheels 5RL and 5RR. In this case, front and rear desired wheel-brake cylinder pressure differences $\Delta Ps_F$ and $\Delta Ps_R$ are represented by the following expressions (7) and (8).

$$\Delta Ps_F = 2 \times Kb_F \times (|Ms| - Ms1)/T \quad (7)$$

$$\Delta Ps_R = 2 \times Kb_R \times Ms1/T \quad (8)$$

where $Kb_F$ denotes a predetermined conversion coefficient used to convert a front-wheel braking force into a front wheel-brake cylinder pressure, $Kb_R$ denotes a predetermined conversion coefficient used to convert a rear-wheel braking force into a rear wheel-brake cylinder pressure, T of the expression (7) and T of the expression (8) denote front and rear wheel treads being the same in front and rear wheels, and Ms1 denotes the predetermined desired yaw-moment threshold value.

In setting front and rear desired wheel-brake cylinder pressure differences $\Delta Ps_F$ and $\Delta Ps_R$ in case of |Ms|≧Ms1, the system of the embodiment actually determines both of the front and rear desired brake fluid pressure differences $\Delta Ps_F$ and $\Delta Ps_R$ based on the above expressions (7) and (8). Instead of producing the desired yaw-moment controlled variable needed for LDP control by creating both of the front and rear desired brake fluid pressure differences $\Delta Ps_F$ and $\Delta Ps_R$, the desired yaw moment may be produced by only the front desired wheel-brake cylinder pressure difference $\Delta Ps_F$. In such a case, front and rear desired wheel-brake cylinder pressure differences $\Delta Ps_F$ and $\Delta Ps_R$ are obtained from the following expressions.

$$\Delta Ps_R = 0$$

$$\Delta Ps_F = 2 \cdot Kb_F \cdot |Ms|/T$$

Therefore, when desired yaw moment Ms is a negative value (Ms<0), in other words, the host vehicle tends to deviate from the current driving lane to the left, in order to produce the component of yaw moment vector needed to rotate the host vehicle to the right, front-left desired wheel-brake cylinder pressure $Ps_{FL}$ is set to master-cylinder pressure Pm, front-right desired wheel-brake cylinder pressure $Ps_{FR}$ is set to the sum (Pm+$\Delta Ps_F$) of master-cylinder pressure Pm and front desired wheel-brake cylinder pressure difference $\Delta Ps_F$, rear-left desired wheel-brake cylinder pressure $Ps_{RL}$ is set to rear-wheel master-cylinder pressure PmR, and rear-right desired wheel-brake cylinder pressure $Ps_{RR}$ is set to the sum (PmR+$\Delta Ps_R$) of rear-wheel master-cylinder pressure PmR and rear desired wheel-brake cylinder pressure difference $\Delta Ps_R$ (see the following expression (9)).

$$Ps_{FL} = Pm \quad (9)$$

-continued $$Ps_{FR} = Pm + \Delta Ps_F$$

$$Ps_{RL} = PmR$$

$$Ps_{RR} = PmR + \Delta Ps_R$$

On the contrary, when desired yaw moment Ms is a positive value (Ms≧0), in other words, the host vehicle tends to deviate from the current driving lane to the right, in order to produce the component of yaw moment vector needed to rotate the host vehicle to the left, front-left desired wheel-brake cylinder pressure $Ps_{FL}$ is set to the sum (Pm+$\Delta Ps_F$) of master-cylinder pressure Pm and front desired wheel-brake cylinder pressure difference $\Delta Ps_F$, front-right desired wheel-brake cylinder pressure $Ps_{FR}$ is set to master-cylinder pressure Pm, rear-left desired wheel-brake cylinder pressure $Ps_{RL}$ is set to the sum (PmR+$\Delta Ps_R$) of rear-wheel master-cylinder pressure PmR and rear desired wheel-brake cylinder pressure difference $\Delta Ps_R$, and rear-right desired wheel-brake cylinder pressure $Ps_{RR}$ is set to rear-wheel master-cylinder pressure PmR (see the following expression (10)).

$$Ps_{FL} = Pm + \Delta Ps_F \quad (10)$$

$$Ps_{FR} = Pm$$

$$Ps_{RL} = PmR + \Delta Ps_R$$

$$Ps_{RR} = PmR$$

In this manner, the system of the embodiment can properly calculate each of desired front and rear wheel-brake cylinder pressures $Ps_{FL}$, $Ps_{FR}$, $Ps_{RL}$ and $Ps_{RR}$ so as to produce desired yaw moment Ms, and thus the LDP control can be executed based on the proper desired front and rear wheel-brake cylinder pressures, irrespective of any driver's manual steering action.

Thereafter, at step S18, a desired driving torque TrqDS is arithmetically calculated as detailed hereunder, under a particular condition where there is a possibility that the host vehicle tends to deviate from the current driving lane and the LDP control is operative ($F_{LD}\neq0$). In the shown embodiment, under the specified condition defined by $F_{LD}\neq0$ (i.e., $F_{LD}=+1$ or $F_{LD}=-1$) or Fdw≠0 (i.e., Fdw=+1 or Fdw=-1), that is, when the LDP control system is in operation, vehicle acceleration is reduced or suppressed by decreasingly compensating for the engine output even when the accelerator pedal is depressed by the driver. Concretely, in case of $F_{LD}\neq0$ or Fdw≠0, desired driving torque TrqDS is calculated from the following expression.

$$TrqDS = f(Acc) - g(Ps)$$

where f(Acc) is a function of accelerator opening Acc read through step S1 and the function f(Acc) is provided to calculate a desired driving torque that is determined based on the accelerator opening Acc and required to accelerate the host vehicle, and g(Ps) is a function of a sum Ps (=$\Delta Ps_F$+$\Delta Ps_R$) of front and rear desired wheel-brake cylinder pressure differences $\Delta Ps_F$ and $\Delta Ps_R$ to be produced during the yaw moment control (LDP control or LK control), and the function g(Ps) is provided to calculate a desired braking torque that is determined based on the summed desired wheel-brake cylinder pressure differences Ps (=$\Delta Ps_F$+$\Delta Ps_R$).

Therefore, when the condition defined by $F_{LD} \neq 0$ (that is, $F_{LD} = +1$ or $-1$) or Fdw$\neq 0$ (that is, Fdw=1 or $-1$) is satisfied, and thus the LDP control is executed, the engine torque output is reduced by the braking torque created based on the summed desired wheel-brake cylinder pressure differences Ps ($=\Delta Ps_F + \Delta Ps_R$).

On the contrary, when the condition defined by $F_{LD}=0$ and Fdw=0 is satisfied, or when the condition defined by $F_{LD}=0$ and $F_{cancel}=1$ is satisfied, desired driving torque TrqDS is determined based on only the driving torque component needed to accelerate the host vehicle (see the following expression).

$$TrqDS = f(Acc)$$

In the shown embodiment, a higher priority is put on the controlled variable of LDP control rather than the manipulated variable of the accelerator pedal by the driver. In lieu thereof, it will be appreciated that the invention is not limited to the particular embodiment shown and described herein, but a higher priority may be put on the manipulated variable of the accelerator pedal by the driver rather than the controlled variable of LDP control, such that the absolute value |MS| of desired yaw moment Ms decreases, as the accelerator opening Acc increases. Subsequently to step S18, step S19 occurs.

At step S19, command signals corresponding to front-left, front-right, rear-left, and rear-right desired wheel-brake cylinder pressures $Ps_{FL}$, $Ps_{FR}$, $Ps_{RL}$, and $Ps_{RR}$, calculated through step S17, are output from the input interface of ECU 8 to hydraulic modulator 7 (serving as a yawing motion control actuator), and at the same time a command signal corresponding to desired driving torque TrqDS, calculated through step S18, is output from the output interface of ECU 8 to driving torque control unit 12. In this manner, one cycle of the time-triggered interrupt routine (the yaw moment control routine or the LDP control routine executed by the system of the embodiment) terminates and the predetermined main program is returned.

The automotive LDP apparatus of the embodiment executing the LDP control routine shown in FIG. 2 operates as follows.

Figure 8:
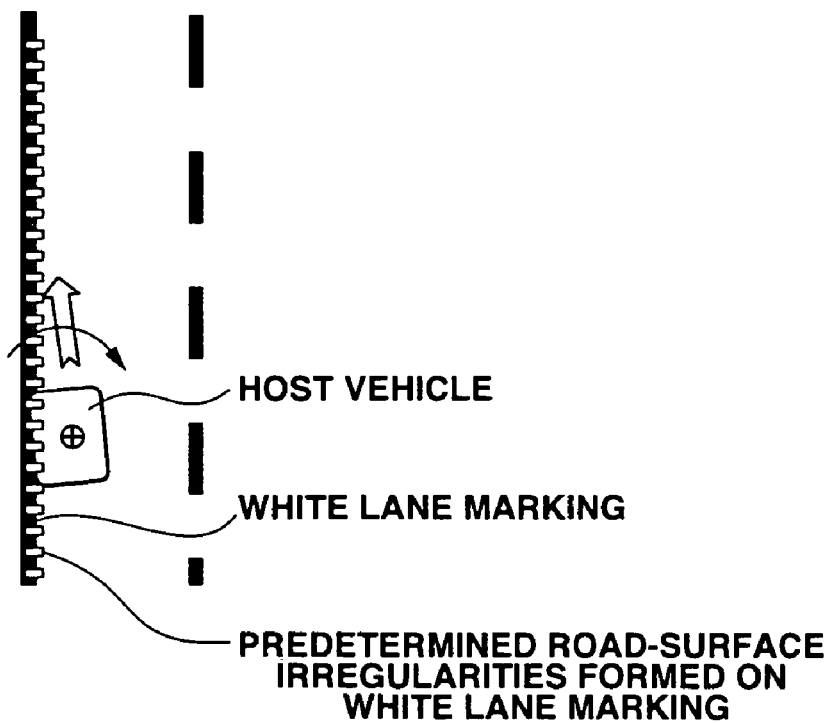
FIG. 8 is an explanatory view showing control actions performed by the apparatus of the embodiment executing the LDP control routine shown in FIG. 2.

Suppose that the host vehicle tends to deviate from the current driving lane to the left owing to the driver's inattentive driving under a condition where the picture image data concerning the white lane marking (the white lane marking line) in front of the host vehicle is sufficiently captured or recognized by CCD camera 13. Then, as shown in FIG. 8, suppose that front-left road wheel 5FL of the host vehicle travels on predetermined road-surface irregularities, equidistantly repeatedly formed on the white lane marking (the white lane marking line) of the left-hand edge of the host vehicle's driving lane. Under these conditions, within the processor of ECU 8, first, input informational data from the previously-noted engine/vehicle switches and sensors, and driving-torque controller 12 and camera controller 14 are read (see step S1 of FIG. 2). As shown in the time period D of the time chart of FIG. 9A, front-left wheel speed $Vw_{FL}$ of front-left road wheel 5FL, that is, front-left wheel acceleration $dVw_{FL}$, remarkably oscillating and fluctuating at the substantially constant period, such as the time period ($T_{so}$ – TsL), is read or detected. On the other hand, as shown in the time period D of the time chart of FIG. 9B, front-right wheel speed $Vw_{FR}$ of front-right road wheel 5FR, that is, front-right wheel acceleration $dVw_{FR}$, slightly oscillating and fluctuating. Recognition flag $F_{camready}$ is set to "1", since the white lane marking in front of the host vehicle is satisfactorily detected and captured by CCD camera 13. Thereafter, at step S2, host vehicle speed V is calculated from the expression $V = (Vw_{FL} + Vw_{FR})/2$. At step S3, lateral-displacement estimate XS (the estimated future lateral displacement) is calculated from the expression $XS = Tt \times V \times (\phi + Tt \times V \times \beta) + X$. Due to the increased host vehicle's lane deviation tendency, the calculated lateral-displacement estimate XS becomes greater than predetermined lateral-displacement criterion $X_c$. After this, at step S4, front-left wheel acceleration $dVw_{FL}$ is arithmetically calculated based on the latest up-to-date information concerning front-left wheel speed $Vw_{FL}$. On the basis of the calculated front-left wheel acceleration $dVw_{FL}$, only the road-surface irregularities decision flag $Fot_{FL}$ for front-left road wheel 5FL is set to "1". At step S5, road-edge decision flag Fdw is set to "1" with road-surface irregularities decision flag $Fot_{FL}$ set (=1). At step S6, lane-changing indicative flag $F_{LC}$ is reset to "0", since the host vehicle tends to deviate from the driving lane with no driver's intention for lane changing. Thereafter, the routine proceeds via step S7 to step S8. At step S8, the processor of ECU 8 determines that there is an increased tendency for the host vehicle to deviate from the current driving lane to the left, owing to the condition of $XS \geq X_c$. Thus, lane-deviation decision flag $F_{LD}$ is set to "+1". Under these conditions, that is, with recognition flag $F_{camready}$ set (=1) and road-edge decision flag Fdw set (=+1), the answer to step S9 and the answer to step S10 become both affirmative (YES). Therefore, the routine advances from step S10 to step S12 and thus control gain Khr is set to predetermined gain Khr1 (>1) and additionally controlled-variable offset $M_{offset}$ is set to "0". Thus, through step S16, desired yaw moment Ms (a negative yaw moment value) is calculated, based on predetermined gain (a relatively great gain) Khr1 (>1), from the expression (5), that is, $Ms = -Khr \times K1 \times K2 \times (XS - X_c) - Fdw \times M_{offset}$, such that a comparatively great yaw moment is produced in a direction (in a right direction) that the host vehicle's lane-deviation tendency is avoided. At step S17, on the basis of the calculated desired yaw moment Ms (the comparatively great negative value, that is, $-Khr \times K1 \times K2 \times (XS - X_c)$), in comparison with the left-hand side desired wheel-brake cylinder pressures $Ps_{FL}$ and $Ps_{RL}$, the right-hand side desired wheel-brake cylinder pressures $Ps_{FR}$ and $Ps_{RR}$ are calculated as relatively higher pressure values (see the expression (9)). Thereafter, the routine advances via step S18 to step S19. At step S19, command signals corresponding to front-left, front-right, rear-left, and rear-right desired wheel-brake cylinder pressures $Ps_{FL}$ (=Pm), $Ps_{FR}$ (=Pm+$\Delta Ps_F$), $Ps_{RL}$ (=PmR), and $Ps_{RR}$ (=mR+$\Delta Ps_R$), calculated through step S17, are output from the input interface of ECU 8 to hydraulic modulator 7. As a result, a comparatively greater yaw moment tending to rotate the host vehicle to the right can be created, thus effectively preventing the host vehicle from deviating from the driving lane to the left.

As set out above, according to the system of the embodiment executing the LDP control routine shown in FIG. 2, when (i) the first condition ($F_{LD}=+1$ or $-1$) where there is an increased tendency for the host vehicle to deviate from the driving lane to the left (or to the right), and (ii) the second condition (Fdw=+1 or $-1$) where front-left road wheel 5FL (or front-right road wheel 5FR) of the host vehicle travels on predetermined road-surface irregularities, equidistantly repeatedly formed on the white lane marking of the leftmost edge (or the rightmost edge) of the host vehicle's driving lane, are both satisfied, a comparatively great yaw moment Ms can be arithmetically calculated from the expression (5) (see setting of control gain Khr to predetermined great gain Khr1 (>1) and the flow from step S9 via step S10 to step S12 in FIG. 2), so that a comparatively great yawing moment, exerting on the host vehicle, is produced in the direction in which the increased lane-deviation tendency is avoided. This more certainly avoid the host vehicle from deviating from the driving lane to the left or to the right. Assuming that only the first condition ($F_{LD}$=+1 or −1) is detected by the picture image data captured by CCD camera 13 (an external recognizing detector) without considering the second condition (Fdw=+1 or −1), as can be seen from the expression (5), the magnitude of control gain Khr cannot be set to a value greater than "1", in other words, the maximum value of control gain Khr is "1", since the flow from step S10 to step S12 never occurs, in other words, control gain Khr cannot be set to a value greater than "1". In such a case, on the assumption that control gain Khr is set to "1", desired yaw moment Ms may be calculated based on the deviation (XS−$X_c$) (derived from the picture image data) between lateral-displacement estimate XS and predetermined lateral-displacement criterion $X_c$ from the expression Ms=−K1×K2×(XS−$X_c$), because Khr=1 and the term −Fdw×$M_{offset}$ is eliminated in the expression (5). As can be appreciated from comparison between the expression Ms=−Khr×K1×K2×(XS−$X_c$)−Fdw×$M_{offset}$ and the expression Ms=−K1×K2×(XS−$X_c$), when the first and second conditions are both satisfied and control gain Khr is set to predetermined gain Khr1 (>1), as a matter of course, the absolute value |MS| of desired yaw moment Ms obtained by the expression Ms=−Khr×K1×K2×(XS−$X_c$)−Fdw×$M_{offset}$ becomes greater than the absolute value |MS| of desired yaw moment Ms obtained by the expression Ms=−K1×K2×(XS−$X_c$). That is, the LDP control system of the embodiment, taking into account both of the first and second conditions and using the expression Ms=−Khr×K1×K2×(XS−$X_c$)−Fdw×$M_{offset}$, is superior to the LDP control system based on only the picture image data for detection of the host vehicle's lane-deviation tendency and using the expression Ms=−K1×K2×(XS−$X_c$), in the enhanced lane deviation avoidance performance.

Next, suppose that the host vehicle tends to deviate from the current driving lane to the left under a condition where the picture image data concerning the white lane marking (the white lane line) in front of the host vehicle cannot be sufficiently captured or recognized by CCD camera 13, owing to poor visibility arising from extreme weather situations such as a thick fog, strong snowfall, extreme rain or icing of the host vehicle. Then, as shown in FIG. 8, suppose that front-left road wheel 5FL of the host vehicle travels on predetermined road-surface irregularities, equidistantly repeatedly formed on the white lane marking (the white lane marking line) of the leftmost edge of the host vehicle's driving lane. Under these conditions, within the processor of ECU 8, first, input informational data from the previously-noted engine/vehicle switches and sensors, and driving-torque controller 12 and camera controller 14 are read (see step S1 of FIG. 2). As shown in the time period D of the time chart of FIG. 9A, front-left wheel speed $Vw_{FL}$ of front-left road wheel 5FL, that is, front-left wheel acceleration $dVw_{FL}$, remarkably oscillating and fluctuating at the substantially constant period, such as the time period ($T_{so}$−TsL), is read or detected. In this case, the host vehicle's yaw angle φ, lateral deviation X, and curvature β is set to "0". Recognition flag $F_{camready}$ is reset to "0", since the white lane marking in front of the host vehicle is not satisfactorily captured by CCD camera 13. At step S2, host vehicle speed V (=($Vw_{FL}$+$Vw_{FR}$)/2) is calculated. At step S3, lateral-displacement estimate XS (the estimated future lateral displacement) is set to "0", because of φ=0, X=0, and β=0. At step S4, front-left wheel acceleration $dVw_{FL}$ is calculated based on the latest up-to-date information for front-left wheel speed $Vw_{FL}$, and only the road-surface irregularities decision flag $Fot_{FL}$ for front-left road wheel 5FL is set to "1" on the basis of the calculated front-left wheel acceleration $dVw_{FL}$. At step S5, road-edge decision flag Fdw is set to "+1" with road-surface irregularities decision flag $Fot_{FL}$ set (=1). At step S6, lane-changing indicative flag $F_{LC}$ is reset to "0", since the host vehicle tends to deviate from the driving lane with no driver's intention for lane changing. Thereafter, the routine proceeds via step S7 to step S8. At step S8, the processor of ECU 8 determines that there is a less possibility of the host vehicle's lane deviation from the current driving lane to the left, because of XS=0 and consequently −$X_c$<XS (=0)<$X_c$. Thus, lane-deviation decision flag $F_{LD}$ is reset to "0". Under these conditions, that is, with recognition flag $F_{camready}$ reset (=0) and road-edge decision flag Fdw set (=+1), the answer to step S9 becomes negative (NO) and the answer to step S13 becomes affirmative (YES). Therefore, the routine advances from step S13 to step S15 and thus control gain Khr is set to "0" and additionally controlled-variable offset $M_{offset}$ is set to predetermined constant value Mo. Thus, through step S16, desired yaw moment Ms (a negative yaw moment value) is calculated, based on controlled-variable offset $M_{offset}$ (=predetermined constant value Mo), from the expression (5), that is, Ms=−Khr×K1×K2×(XS−$X_c$)−Fdw×$M_{offset}$, such that a predetermined constant yaw moment is produced in a direction (in a right direction) that the host vehicle returns to the central axis (the central position) of the current driving lane. At step S17, on the basis of the calculated desired yaw moment Ms (the predetermined constant negative value=−Fdw×$M_{offset}$), in comparison with the left-hand side desired wheel-brake cylinder pressures $Ps_{FL}$ and $Ps_{RL}$, the right-hand side desired wheel-brake cylinder pressures $Ps_{FR}$ and $Ps_{RR}$ are calculated as relatively higher pressure values (see the expression (9)). Thereafter, the routine advances via step S18 to step S19. At step S19, command signals corresponding to front-left, front-right, rear-left, and rear-right desired wheel-brake cylinder pressures $Ps_{FL}$ (=Pm), $Ps_{FR}$ (=Pm+$\Delta Ps_F$), $Ps_{RL}$ (=PmR), and $Ps_{RR}$ (=mR+$\Delta Ps_R$), calculated through step S17, are output from the input interface of ECU 8 to hydraulic modulator 7. As a result, a predetermined constant yaw moment tending to rotate the host vehicle to the right (clockwise direction as viewed from the top view of FIG. 8) can be created, thus enabling the host vehicle to return to the central position of the driving lane during vehicle lane-keeping control (during vehicle yawing motion control) and consequently avoiding the host vehicle from deviating from the driving lane.

As set forth above, according to the system of the embodiment executing the control routine of FIG. 2, when only the second condition (Fdw=+1 or −1) where front-left road wheel 5FL (or front-right road wheel 5FR) of the host vehicle travels on predetermined road-surface irregularities, equidistantly repeatedly formed on the white lane marking of the left-hand edge (or the right-hand edge) of the host vehicle's driving lane, is satisfied, a predetermined constant yaw moment (i.e., Ms=−Fdw×$M_{offset}$) can be arithmetically calculated from the expression (5) (see setting of controlled-variable offset $M_{offset}$ to predetermined constant value Mo and the flow from step S9 via step S13 to step S15 in FIG. 2), so that a predetermined constant yaw moment, exerting on the host vehicle, is produced in the direction that permits the host vehicle to return to the central position of the driving lane. Thus, even when the picture image data concerning the white lane marking in front of the host vehicle cannot be sufficiently captured by CCD camera 13 owing to reduced visibility, it is possible to effectively avoid the host vehicle from deviating from the driving lane and to enable lane-keeping support for the host vehicle. In addition to the above, creating the predetermined constant yaw moment rotating the host vehicle in the lane-deviation avoidance direction, enables easy change of the host vehicle's heading or easy turning of the host vehicle at an earlier timing that does not allow the driver to have the least inkling of the fact that front-left road wheel 5FL of the host vehicle now travels on the predetermined road-surface irregularities, equidistantly repeatedly formed on the white lane marking (the white lane line) of the leftmost or rightmost edge of the host vehicle's driving lane. Such a change of the host vehicle's heading, automatically performed by the LDP system of the embodiment, timely effectively informs the driver of the current steered direction, thereby permitting the driver to successfully cope with the lane-deviation tendency with mental composure even under a condition where there is reduced visibility due to extreme weather situations.

Referring now to FIG. 10, there is shown the modified control routine executed by the processor of ECU 8 of the LDP apparatus of the embodiment. The modified control routine shown in FIG. 10 is also executed as time-triggered interrupt routines to be triggered every predetermined time intervals such as 20 milliseconds. Briefly speaking, the modified routine of FIG. 10 is different from the control routine of FIG. 2, in that in the modified routine of FIG. 10, lane deviation prevention (LDP) control is executed only when either one of front-left and front-right road wheels 5FL and 5FR of the host vehicle is traveling on the predetermined irregularities formed on the white lane marking of the driving lane, without determining, based on the picture image data concerning the white lane marking in front of the host vehicle (in other words, based on the comparison result between lateral-displacement estimate XS and predetermined lateral-displacement criterion $X_c$), whether there is an increased tendency for the host vehicle to deviate from the driving lane. The modified routine of FIG. 10 is similar to the control routine of FIG. 2, except that in the modified routine of FIG. 10 steps S3, S7, S9–S15 are canceled and additionally steps S8 and S16 included in the routine shown in FIG. 2 are replaced with steps S8' and S16' included in the routine shown in FIG. 10. Thus, the same step numbers used to designate steps in the routine shown in FIG. 2 will be applied to the corresponding step numbers used in the modified routine shown in FIG. 10, for the purpose of comparison of the two different interrupt routines shown in FIGS. 2 and 10. Steps S8' and S16' will be hereinafter described in detail with reference to the accompanying drawings, while detailed description of steps S1, S2, S4–S6, and S17–S19 will be omitted because the above description thereon seems to be self-explanatory.

At step S8', in order to determine whether there is a possibility or an increased tendency of the host vehicle's lane deviation from the current driving lane, the processor of ECU 8 makes a lane-deviation decision, while using the state of lane-changing indicative flag $F_{LC}$ and the state of road-edge decision flag Fdw, instead of using the picture image data, namely the comparison result between lateral-displacement estimate XS and predetermined lateral-displacement criterion $X_c$. Concretely, at step S8', a check is made to determine whether lane-changing indicative flag $F_{LC}$, whose setting (=1) or resetting (=0) is determined through step S6, is reset (=0). When lane-changing indicative flag $F_{LC}$ is reset (=0) and thus the host vehicle tends to deviate from the driving lane with no driver's intention for lane changing, a further check is made to determine whether road-edge decision flag Fdw, whose setting (=+1 or −1) or resetting (=0) is determined through step S5, is set to "+1". When $F_{LC}$=0 and Fdw=+1, the processor of ECU 8 determines that the host vehicle tends to deviate from the current driving lane to the left and thus lane-deviation decision flag $F_{LD}$ is set to "+1". When $F_{LC}$=0 and Fdw≠+1, another check is made to determine whether road-edge decision flag Fdw is set to "−1". When $F_{LC}$=0 and Fdw=−1, the processor of ECU 8 determines that the host vehicle tends to deviate from the current driving lane to the right and thus lane-deviation decision flag $F_{LD}$ is set to "−1". On the contrary, when $F_{LC}$=0 and Fdw=0, the processor of ECU 8 determines that the host vehicle does not tend to deviate from the current driving lane to the left or to the right and thus lane-deviation decision flag $F_{LD}$ is reset to "0".

Conversely when lane-changing indicative flag $F_{LC}$ is set (=1) and thus the host vehicle tends to deviate from the driving lane with driver's intention for lane changing, the processor of ECU 8 determines that there is no necessity for execution of LDP control, and thus lane-deviation decision flag $F_{LD}$ is reset to "0". In a similar manner, when a tire grip on the road reaches a limit, in other words, during skid control, during traction control, or during vehicle dynamics control, the LDP control has to be generally inhibited. Thus, during skid control, during traction control, or during vehicle dynamics control, lane-deviation decision flag $F_{LD}$ is also forcibly reset to "0".

At step S16', desired yaw moment Ms is arithmetically calculated. Concretely, a check is made to determine whether the condition defined by $F_{LD}$≠0 (that is, $F_{LD}$=+1 or −1) is satisfied. When the condition defined by $F_{LD}$≠0 (that is, $F_{LD}$=+1 or −1) is satisfied, that is, when there is an increased tendency for the host vehicle to deviate from the driving lane to the left or to the right, desired yaw moment Ms is arithmetically calculated from the following expression (11). Conversely when the condition defined by $F_{LD}$≠0 (that is, $F_{LD}$=+1 or −1) is unsatisfied, in other words, when the condition defined by $F_{LD}$=0 is satisfied, desired yaw moment Ms is set to "0".

$$Ms = -Fdw \times Mo \qquad (11)$$

where Mo denotes a predetermined constant value and Fdw denotes the road-edge decision flag.

In the modified routine of FIG. 10, the predetermined value Mo, which is used for calculation of desired yaw moment Ms under the condition defined by $F_{LD}$≠0 (that is, $F_{LD}$=+1 or −1), is a fixed value. Instead of using the fixed value Mo, the predetermined value Mo may be set as a variable, which is variably determined depending on various factors, namely host vehicle speed V, yaw rate φ', lateral acceleration Yg, the host vehicle's turning state such as steer angle δ, yaw angle φ, and the like.

The automotive LDP apparatus executing the modified routine shown in FIG. 10 operates as follows.

Suppose that the host vehicle tends to deviate from the current driving lane to the left in reduced visibility situations, that is, in extreme weather situations such as a thick fog, strong snowfall, extreme rain or icing of the host vehicle. Then, as shown in FIG. 8, suppose that front-left road wheel 5FL of the host vehicle travels on predetermined road-surface irregularities, equidistantly repeatedly formed on the white lane marking (the white lane marking line) of the leftmost edge of the host vehicle's driving lane. Under these conditions, within the processor of ECU 8, first, input informational data from the previously-noted engine/vehicle switches and sensors, and driving-torque controller 12 and camera controller 14 are read (see step S1 of FIG. 10). As shown in the time period D of the time chart of FIG. 9A, front-left wheel speed $Vw_{FL}$ of front-left road wheel 5FL, that is, front-left wheel acceleration $dVw_{FL}$, remarkably oscillating and fluctuating at the substantially constant period, such as the time period ($T_{so}$–TsL), is read or detected. Thereafter, the routine proceeds via step S2 to step S4. At step S4, front-left wheel acceleration $dVw_{FL}$ is calculated based on the latest up-to-date information for front-left wheel speed $Vw_{FL}$, and only the road-surface irregularities decision flag $Fot_{FL}$ for front-left road wheel 5FL is set to "1" on the basis of the calculated front-left wheel acceleration $dVw_{FL}$. At step S5, road-edge decision flag Fdw is set to "+1" with road-surface irregularities decision flag $Fot_{FL}$ set (=1). At step S6, lane-changing indicative flag $F_{LC}$ is reset to "0", since the host vehicle tends to deviate from the driving lane with no driver's intention for lane changing. At step S8', the processor of ECU 8 determines, based on both of the state of lane-changing indicative flag $F_{LC}$ (=0) and the state of road-edge decision flag Fdw (=+1), that there is an increased tendency for the host vehicle to deviate from the current driving lane to the left with no driver's intention for lane changing. Thus, lane-deviation decision flag $F_{LD}$ is set to "+1". Under the condition of $F_{LD}$=+1, through step S16', desired yaw moment Ms (a negative yaw moment value) is calculated, based on the predetermined constant value Mo and road-edge decision flag Fdw (=+1), from the expression (11), that is, Ms=−Fdw×Mo, such that a predetermined constant yaw moment is produced in a direction (in a right direction) that the host vehicle returns to the central axis (the central position) of the current driving lane. At step S17, on the basis of the calculated desired yaw moment Ms (the predetermined constant negative value=−Fdw×Mo), in comparison with the left-hand side desired wheel-brake cylinder pressures $Ps_{FL}$ and $Ps_{RL}$, the right-hand side desired wheel-brake cylinder pressures $Ps_{FR}$ and $Ps_{RR}$ are calculated as relatively higher pressure values (see the expression (9)). Thereafter, the routine advances via step S18 to step S19. At step S19, command signals corresponding to front-left, front-right, rear-left, and rear-right desired wheel-brake cylinder pressures $Ps_{FL}$ (=Pm), $Ps_{FR}$ (=Pm+$\Delta Ps_F$), $Ps_{RL}$ (=PmR), and $Ps_{RR}$ (=mR+$\Delta Ps_R$), calculated through step S17, are output from the input interface of ECU 8 to hydraulic modulator 7. As a result, a predetermined constant yaw moment tending to rotate the host vehicle to the right (clockwise direction as viewed from the top view of FIG. 8) can be created, thus enabling the host vehicle to return to the central position of the driving lane and consequently avoiding the host vehicle from deviating from the driving lane.

As set forth above, the LDP control system executing the modified routine of FIG. 10, can easily simply detect or determine, based on the front wheel speed $Vw_{FL}$ (or $Vw_{FR}$) of the host vehicle, whether either one of front road wheels 5FL and 5FR is traveling on predetermined road-surface irregularities, which are equidistantly repeatedly formed on the white lane marking. Thus, sensor signals from wheel speed sensors commonly used for skid control of ABS system equipped vehicles can be also used for the LDP control system executing the modified routine of FIG. 10. Additionally, the modified routine of FIG. 10 is somewhat simplified in comparison with the control routine of FIG. 2. The modified routine of FIG. 10 and the use of wheel speed sensors common to skid control (or traction control) and LDP control, as a whole, contribute to an inexpensive combined system of skid control (or traction control) and LDP control.

Figure 11:
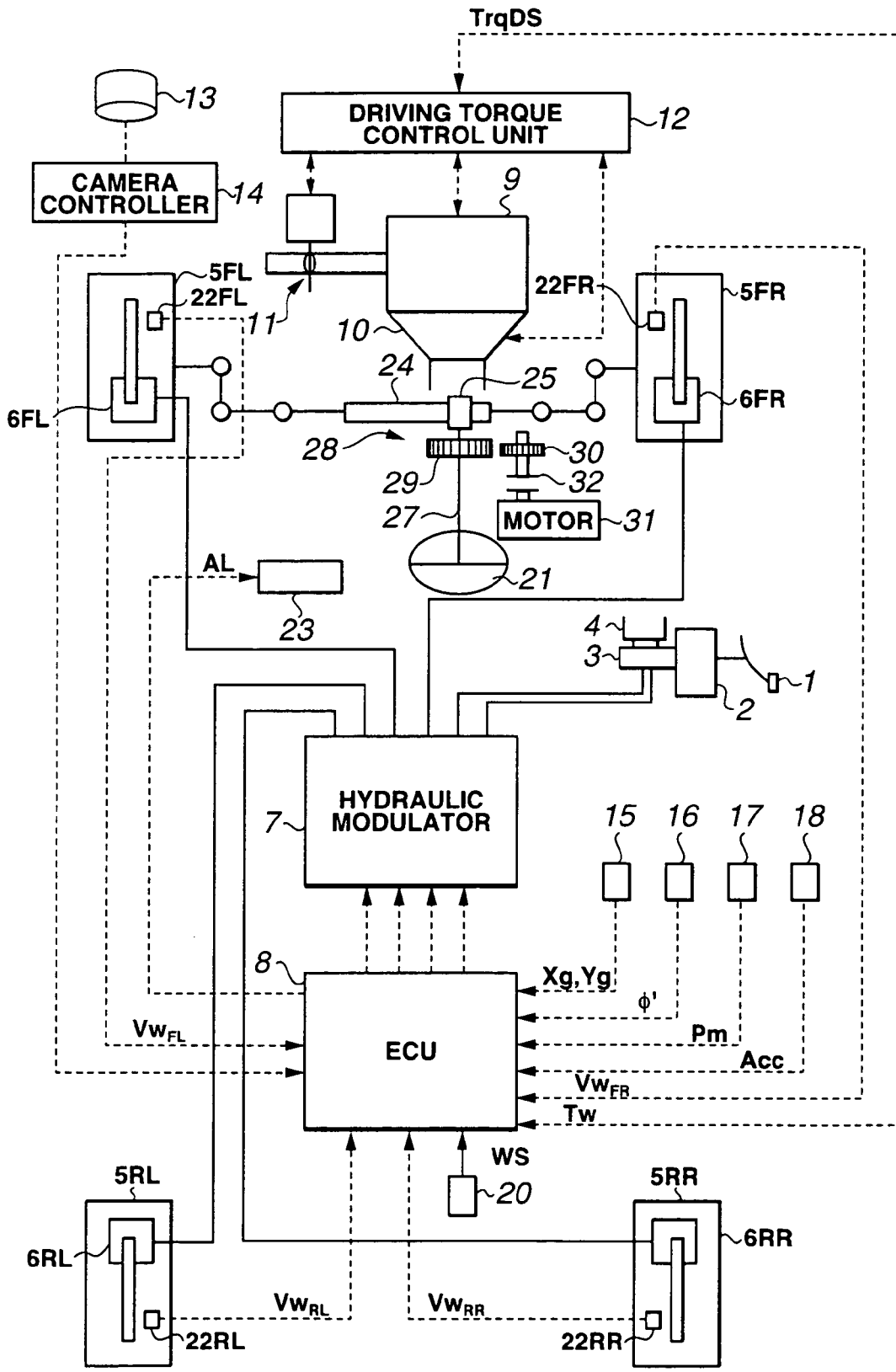
FIG. 11 is a system block diagram illustrating a modified LDP apparatus employing a steering-actuator equipped LDP control system.

Referring now to FIG. 11, there is shown the modified automotive LDP apparatus employing the steering-actuator equipped LDP control system through which a steering torque is automatically produced in a direction that the host vehicle returns to the central axis (the central position) of the driving lane, when the processor of ECU 8 detects or determines that either one of front road wheels 5FL and 5FR of the host vehicle travels on predetermined road-surface irregularities, equidistantly repeatedly formed on the white lane marking of the left-hand side (the leftmost edge) or the right-hand side (the rightmost edge) of the host vehicle's driving lane.

As shown in FIG. 11, a conventional rack-and-pinion steering mechanism is provided between front road wheels 5FL and 5FR. The conventional steering mechanism is comprised of at least a rack 24 linked to a steering arm such as a steering knuckle of each front road wheel 5FL (5FR), a pinion 25 in meshed-engagement with rack 24, and a steering shaft 27 through which steering torque is transmitted from steering wheel 21 to pinion gear 25. An auto-steering mechanism or an auto-pilot mechanism 28, which constructs a steering actuator (serving as a vehicle yawing motion control actuator) used for automatic steering action or auto-pilot for the front road wheels, is also provided above the pinion 25. Auto-steering mechanism 28 is comprised of a driven gear 29 coaxially fixedly connected to steering shaft 27, a drive gear 30 in meshed-engagement with driven gear 29, and an auto-steering motor 31 that drives drive gear 30. A clutch mechanism 32 is also provided between the motor shaft of auto-steering motor 31 and drive gear 30, for connecting the auto-steering motor shaft to, or disconnecting it from the shaft of drive gear 30. Only during operation of auto-steering mechanism 28, in other words, only during the auto-steering control mode, clutch mechanism 32 is held engaged. During the inoperative state of auto-steering mechanism 28, clutch mechanism 32 is disengaged to inhibit input torque created by auto-steering motor 31 from being transmitted to steering shaft 27.

Figure 12:
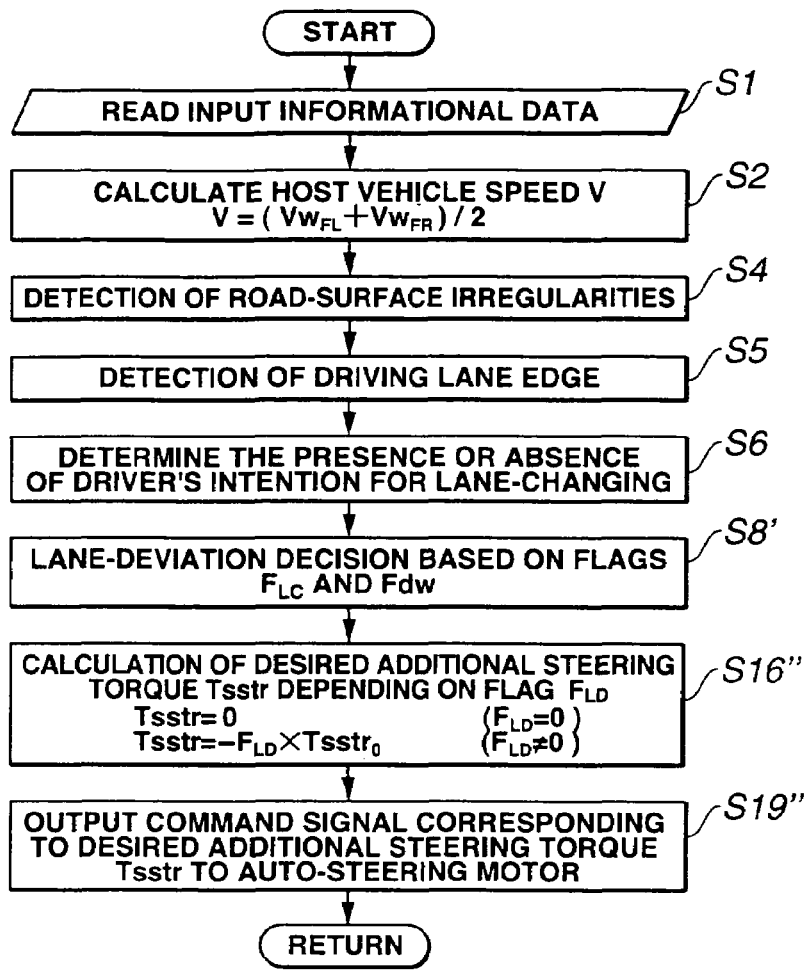
FIG. 12 is a flow chart showing a control routine (arithmetic and logic operations) executed within a braking/driving force control unit incorporated in the modified LDP apparatus shown in FIG. 11.

The LDP control routine executed by ECU 8 incorporated in the steering-actuator equipped automotive LDP apparatus shown in FIG. 11 is hereunder described in detail in reference to the flow chart shown in FIG. 12. The LDP control routine of FIG. 12 is also executed as time-triggered interrupt routines to be triggered every predetermined sampling time intervals $\Delta T$ such as 20 milliseconds. Briefly speaking, the control routine of FIG. 12 is different from that of FIG. 10, in that in the system executing the routine of FIG. 12 a desired additional steering torque Tsstr (described later and different from a steering torque manually acting on the steering wheel by the driver) is used for automatic LDP control instead of controlling braking forces applied to respective road wheels. The routine of FIG. 12 is similar to that of FIG. 10, except that in the routine of FIG. 12 steps S17 and S18 are canceled and additionally steps S16' and S19 included in the routine shown in FIG. 10 are replaced by steps S16" and S19" included in the routine shown in FIG. 12. Thus, the same step numbers used to designate steps in the routine shown in FIG. 10 will be applied to the corresponding step numbers used in the routine shown in FIG. 12, for the purpose of comparison of the two different interrupt routines shown in FIGS. 10 and 12. Steps S16" and S19" will be hereinafter described in detail with reference to the accompanying drawings, while detailed description of steps S1, S2, S4–S6, and S8' will be omitted because the above description thereon seems to be self-explanatory.

At step S16", the processor of ECU 8 calculates or determines desired additional steering torque Tsstr, based on the state of lane-deviation decision flag $F_{LD}$. Concretely, a check is made to determine whether lane-deviation decision flag $F_{LD}$ is set (=+1 or −1). When the condition defined by $F_{LD}$=+1 or $F_{LD}$=−1 is satisfied, in other words, the processor of ECU 8 determines that it is necessary to generate a yawing moment by way of LDP control of the steering-actuator equipped LDP control system, desired additional steering torque Tsstr is arithmetically calculated from the following expression (12). In contrast, when the condition defined by $F_{LD}$=0 is satisfied, desired additional steering torque Tsstr is set to "0".

$$Tsstr = -F_{LD} \times Tsstr0 \qquad (12)$$

where Tsstr0 denotes a predetermined constant value. As discussed above, in the LDP apparatus capable of executing the routine of FIG. 12, desired additional steering torque Tsstr is calculated or determined as a controlled variable for feedback control (LDP control).

After desired additional steering torque Tsstr is determined through step S16", step S19" occurs.

At step S19", a command signal (or a drive signal) corresponding to desired additional steering torque Tsstr calculated through step S16", is output from the input interface of ECU 8 to auto-steering motor 31. In this manner, one cycle of the time-triggered interrupt routine (the routine of FIG. 12) terminates and the predetermined main program is returned.

The automotive LDP apparatus executing the additional-steering-torque based LDP control routine shown in FIG. 12 operates as follows.

Suppose that the host vehicle tends to deviate from the current driving lane to the left in reduced visibility situations, that is, in extreme weather situations such as a thick fog, strong snowfall, extreme rain or icing of the host vehicle. Then, as shown in FIG. 8, suppose that front-left road wheel 5FL of the host vehicle travels on predetermined road-surface irregularities, equidistantly repeatedly formed on the white lane marking (the white lane line) of the leftmost edge of the host vehicle's driving lane. Under these conditions, within the processor of ECU 8, first, input informational data from the previously-noted engine/vehicle switches and sensors, and driving-torque controller 12 and camera controller 14 are read (see step S1 of FIG. 12). As shown in the time period D of the time chart of FIG. 9A, front-left wheel speed $Vw_{FL}$ of front-left road wheel 5FL, that is, front-left wheel acceleration $dVw_{FL}$, remarkably oscillating and fluctuating at the substantially constant period, such as the time period ($T_{so}$−TsL), is read or detected. Thereafter, the routine proceeds via step S2 to step S4. At step S4, front-left wheel acceleration $dVw_{FL}$ is calculated based on the latest up-to-date information for front-left wheel speed $Vw_{FL}$, and only the road-surface irregularities decision flag $Fot_{FL}$ for front-left road wheel 5FL is set to "1" on the basis of the calculated front-left wheel acceleration $dVw_{FL}$. At step S5, road-edge decision flag Fdw is set to "+1" with road-surface irregularities decision flag $Fot_{FL}$ set (=1). At step S6, lane-changing indicative flag $F_{LC}$ is reset to "0", since the host vehicle tends to deviate from the driving lane with no driver's intention for lane changing. At step S8', the processor of ECU 8 determines, based on both of the state of lane-changing indicative flag $F_{LC}$ (=0) and the state of road-edge decision flag Fdw (=+1), that there is an increased tendency for the host vehicle to deviate from the current driving lane to the left with no driver's intention for lane changing. Thus, lane-deviation decision flag $F_{LD}$ is set to "+1". Under the condition of $F_{LD}$=+1, through step S16", desired additional steering torque Tsstr (a negative additional steering torque value) is calculated, based on lane-deviation decision flag $F_{LD}$ (=+1), from the expression (12), that is, Tsstr=−$F_{LD}$× Tsstr0, so that an automatically-controlled steer angle δ is produced in a direction (in a right direction) that the host vehicle returns to the central axis (the central position) of the current driving lane. Thereafter, at step S19", a command signal (a drive signal) corresponding to desired additional steering torque Tsstr, calculated through step S16", is output from the input interface of ECU 8 to auto-steering motor 31. As a result, by way of auto-steering control, the actual additional steering torque of steering shaft 27 is brought closer to the desired additional steering torque Tsstr, and thus a proper steering angle tending to rotate the host vehicle to the right (clockwise direction as viewed from the top view of FIG. 8) can be created, thus enabling the host vehicle to return to the central position of the driving lane and consequently avoiding the host vehicle from deviating from the driving lane.

As discussed above, in case of the LDP control system executing the routine of FIG. 12, the command signal (the drive signal) corresponding to desired additional steering torque Tsstr, calculated through step S16", is output to auto-steering motor 31, and as a result the automatically-controlled steer angle δ is produced in a direction that the host vehicle returns to the central axis (the central position) of the current driving lane. In the steering-actuator equipped LDP control system shown in FIGS. 11 and 12, auto-steering mechanism 28, serving as a steering actuator, is used to exert a yawing moment on the host vehicle instead of using hydraulic modulator 7, and thus it is possible to generate a desired yawing moment without decelerating the host vehicle and without giving a feeling of uncomfortable vehicle deceleration to the driver.

In the automotive LDP apparatus of the shown embodiments, capable of executing the respective routines shown in FIGS. 2, 10, and 12, the process of steps S4 and S5, and wheel speed sensors 22FL–22RR serve as a road-surface irregularities detection means. The process of each of step S16 of FIG. 2, step S16' of FIG. 10, and step S16" of FIG. 12 serves as a part of a vehicle yawing motion control means (simply, a host vehicle control means). Wheel speed sensors 22FL–22RR shown in FIGS. 1 and 11 serve as a wheel-speed detection means. CCD camera 13 shown in FIGS. 1 and 11 serves as a picture image pick-up device or a picture image pick-up means. Camera controller 14 shown in FIGS. 1 and 11 serves as a lane marking line detection means. The process of step S8 shown in FIG. 2, and FIGS. 10 and 12 serves as a lane-deviation tendency detection means. The process of each of step S16 shown in FIG. 2, step S16' shown in FIG. 10, and step S16" shown in FIG. 12 also serves as a part of an LDP control means (or a lane deviation avoidance (LDA) control means). The process of steps S17–S19 of FIGS. 2 and 10, and the process of step S19" of FIG. 12 serve as part of the LDP control means. Engine/vehicle switches and sensors and camera controller 14 shown in FIGS. 1 and 11 serve as a driving condition detection means.

In the shown embodiments shown herein, a check for such a state that either one of front road wheels 5FL and 5FR of the host vehicle is traveling on predetermined road-surface irregularities, formed on the white lane marking (the white lane line), is based on front-left and front-right wheel speeds $Vw_{FL}$ and $Vw_{FR}$, exactly, comparison results of front-left wheel acceleration $dVw_{FL}$ and its threshold value $S_{limit}$ and front-right wheel acceleration $dVw_{FR}$ and its threshold value $S_{limit}$. In lieu thereof, such a check may be based on a vertical acceleration of a point of the vehicle suspension, moving up and down or a suspension stroke. In this case, sensor signals from an acceleration sensor (a suspension vertical acceleration sensor or G sensor 15 as shown in FIG. 1) and/or a stroke sensor commonly used for active suspension control of active suspension system equipped vehicles can also be used for the LDP control system. The use of an acceleration sensor and/or a stroke sensor common to active suspension control and LDP control, as a whole, contributes to an inexpensive combined system of active suspension control and LDP control.

Furthermore, when the external recognizing sensor (also serving as a vehicle-path detector) containing the navigation system and/or CCD camera 13 detects that the host vehicle is traveling within a car parking area except road-ways, a check made to determine whether or not either one of front road wheels 5FL and 5FR of the host vehicle is traveling on predetermined road-surface irregularities formed on the white lane marking, may be inhibited to enhance the accuracy of road-surface irregularities detection executed through step S4.

Figure 13:
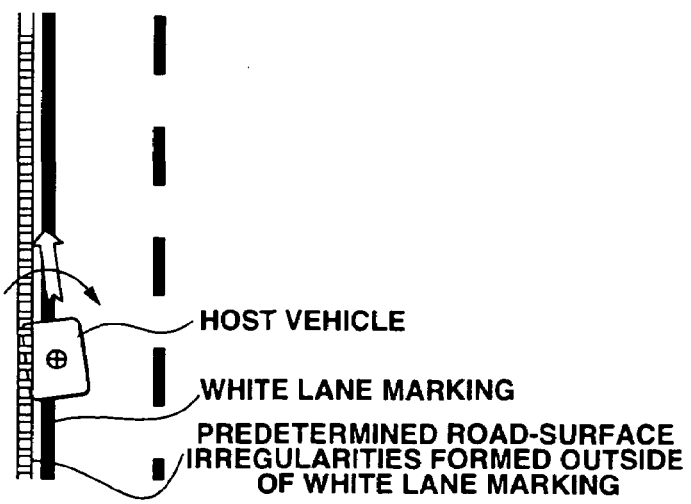
FIG. 13 is an explanatory view showing control actions performed by the modified LDP apparatus executing the routine shown in FIG. 12.

In the shown embodiments, road-surface irregularities decision flag $Fot_{FL}$ (or $Fot_{FR}$) is set to "1", when front-left road wheel 5FL (or front-right road wheel 5FR) is traveling on the predetermined irregularities (corresponding to the ridge portions exemplified in FIG. 3A) equidistantly repeatedly formed on the white lane marking. In lieu thereof, as shown in FIG. 13, road-surface irregularities decision flag $Fot_{FL}$ (or $Fot_{FR}$) may be set to "1", when front-left road wheel 5FL (or front-right road wheel 5FR) is traveling on predetermined irregularities equidistantly repeatedly formed outside of and close to the white lane marking. As seen from the plan view of FIG. 13, preferably, the predetermined irregularities are arranged parallel to and slightly spaced from the white lane marking by a predetermined distance.

Figure 14:
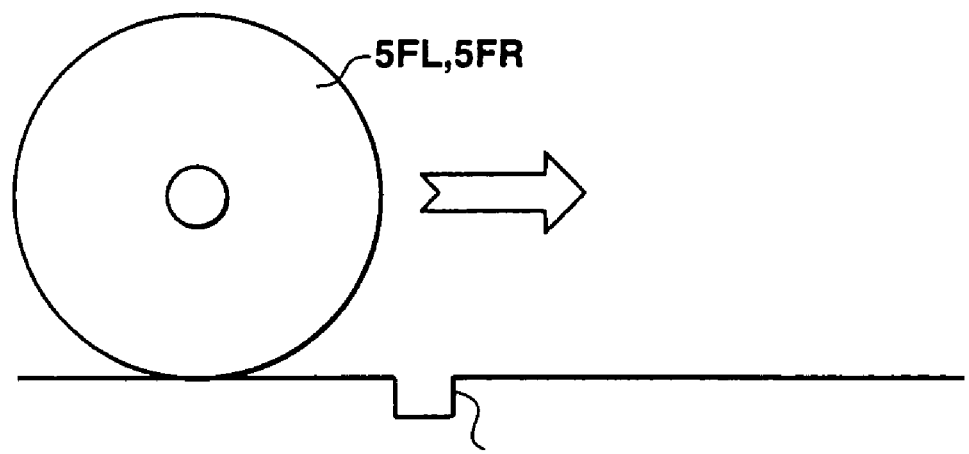
FIG. 14 is an explanatory view showing a modification of wheel speed fluctuations and wheel acceleration fluctuations, occurring due to irregularities of the road surface.

In the shown embodiments, road-surface irregularities decision flag $Fot_{FL}$ (or $Fot_{FR}$) is set to "1", when front-left road wheel 5FL (or front-right road wheel 5FR) is traveling on the predetermined irregularities equidistantly repeatedly formed on the white lane marking by forming the ridged portions (see FIG. 3A) on the lane marking. In lieu thereof, as shown in FIG. 14, road-surface irregularities decision flag $Fot_{FL}$ (or $Fot_{FR}$) may be set to "1", when front-left road wheel 5FL (or front-right road wheel 5FR) is traveling on the predetermined irregularities equidistantly repeatedly formed on the white lane marking by forming recessed portions on the lane marking.

In the shown embodiments, a check for such a state that either one of front road wheels 5FL and 5FR of the host vehicle is traveling on predetermined road-surface irregularities, formed on the white lane marking (the white lane marking line), that is, setting of road-edge decision flag Fdw to "+1" (or to "−1"), is based on front-left and front-right wheel speeds $Vw_{FL}$ and $Vw_{FR}$, exactly, comparison results of front-left wheel acceleration $dVw_{FL}$ and its threshold value $S_{limit}$ and front-right wheel acceleration $dVw_{FR}$ and its threshold value $S_{limit}$. In lieu thereof, setting of road-edge decision flag Fdw may be based on rear-left and rear-right wheel speeds $Vw_{RL}$ and $Vw_{RR}$, exactly, comparison results of rear-left wheel acceleration $dVw_{RL}$ and its threshold value $S_{limitR}$ and rear-right wheel acceleration $dVw_{RR}$ and its threshold value $S_{limitR}$.

In the shown embodiments, when either one of flags $Fot_{FL}$ and $Fot_{FR}$ is set to "1" and road-surface irregularities decision flag $Fot_{FL}$ for front-left road wheel 5FL is set (=1), road-edge decision flag Fdw is set to "+1". When either one of flags $Fot_{FL}$ and $Fot_{FR}$ is set to "1" and road-surface irregularities decision flag $Fot_{FR}$ for front-right road wheel 5FR is set (=1), road-edge decision flag Fdw is set to "−1".

Alternatively, when road-surface irregularities decision flag $Fot_{FL}$ for front-left road wheel 5FL and road-surface irregularities decision flag $Fot_{RL}$ for rear-left road wheel 5RL are both set (=1), road-edge decision flag Fdw may be set to "+1". On the contrary when road-surface irregularities decision flag $Fot_{FR}$ for front-right road wheel 5FR and road-surface irregularities decision flag $Fot_{RR}$ for rear-right road wheel 5RR are both set (=1), road-edge decision flag Fdw may be set to "−1". Such setting of road-edge decision flag Fdw enhances the reliability of setting of road-edge decision flag Fdw.

As discussed above, when either front-left road wheel 5FL or rear-left road wheel 5RL is traveling on predetermined irregularities formed on or close to a white lane marking line or when left road wheels 5FL and 5RL are both traveling on the predetermined irregularities formed on or close to the white lane marking line, road-edge decision flag Fdw may be set to "+1". On the contrary when either front-right road wheel 5FR or rear-right road wheel 5RR is traveling on the predetermined irregularities formed on or close to the white lane marking line or when right road wheels 5FR and 5RR are both traveling on the predetermined irregularities formed on or close to the white lane marking line, road-edge decision flag Fdw may be set to "−1".

The entire contents of Japanese Patent Application No. 2003-118896 (filed Apr. 23, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive lane deviation prevention apparatus comprising:
   a picture image pick-up device that captures a picture image in front of a host vehicle;
   a lane marking line detector that detects a lane marking line based on the picture image captured by the picture image pick-up device; and
   a processor programmed to perform the following:
      execute vehicle yawing motion control by which the host vehicle yaws away from a side position of a driving lane, when the host vehicle is traveling on predetermined irregularities formed on or close to either one of a left-hand side lane marking line and a right-hand side lane marking line of the driving lane that produce vibratory motion input into the host vehicle;
      determine, based on the lane marking line detected, whether the host vehicle tends to deviate from the driving lane;
      execute lane deviation prevention (LDP) control by which the host vehicle's lane deviation tendency is avoided, in presence of the host vehicle's lane-deviation tendency;
   wherein the apparatus is adapted to provide the host vehicle a first desired yaw-moment controlled variable to avoid deviating from the driving lane in the event that the apparatus cannot detect a lane marking line and the vehicle is traveling on the predetermined irregularities formed on or in close proximity to either one of the left-hand side lane marking line and the right-hand side lane marking line of the driving lane;

wherein the apparatus is adapted to provide a second desired yaw-moment controlled variable to avoid deviating from the driving lane in response to the host vehicle's lane deviation tendency detected based on lane marking line detection; and wherein the apparatus is adapted to correct the second desired yaw-moment controlled variable to a large value when the vehicle is traveling on the predetermined irregularities formed on or close to either one of a left-hand side lane marking line and a right-hand side lane marking line of the driving lane.

2. The automotive lane deviation prevention apparatus as claimed in claim 1, further comprising:

wheel speed sensors that detect respective wheel speeds of road wheels of the host vehicle, wherein the processor is further programmed for:
(a) determining, based on signals from the wheel speed sensors, whether the host vehicle is traveling on the predetermined irregularities formed on or close to either one of the left-hand side lane marking line and the right-hand side lane marking line of the driving lane.

3. An automotive lane deviation prevention apparatus according to claim 1, further including wheel speed sensors that detect respective wheel speeds of road wheels of a host vehicle;

wherein the processor is further programmed to perform the following:
determine that the host vehicle is traveling on the predetermined irregularities formed on or close to either one of the left-hand side lane marking line and the right-hand side lane marking line of the driving lane, when at least one of the wheel speeds detected by the wheel speed sensors is fluctuating at a substantially constant time period determined based on a host vehicle speed.

4. An automotive lane deviation prevention apparatus according to claim 1, further including wheel speed sensors that detect respective wheel speeds of road wheels of the host vehicle;

wherein the processor is further programmed to perform the following:
determine that the host vehicle is traveling on the predetermined irregularities formed on or close to either one of the left-hand side lane marking line and the right-hand side lane marking line of a driving lane, only when either one of the left and right wheel speeds is fluctuating.

5. An automotive lane deviation prevention apparatus according to claim 1, further including a vehicle-suspension up-and-down motion sensor that detects an up-and-down motion of a suspension of the host vehicle;

wherein the processor is further programmed to perform the following:
determine, based on the suspension's up-and-down motion detected, whether the host vehicle is traveling on the predetermined irregularities formed on or close to either one of the left-hand side lane marking line and the right-hand side lane marking line of a driving lane.

6. The automotive lane deviation prevention apparatus as claimed in claim 1, wherein the processor is further programmed for:

determining whether the host vehicle is traveling within an area except road-ways; and
inhibiting a check for the host vehicle traveling on the predetermined irregularities, when the host vehicle is traveling within the area except road-ways.

7. The automotive lane deviation prevention apparatus as claimed in claim 1, wherein the processor is further programmed for:

compensating for a control gain for the LDP control in a direction that a desired yaw moment to be exerted on the host vehicle increases, when the host vehicle is traveling on the predetermined irregularities formed on or close to either one of the left-hand side lane marking line and the right-hand side lane marking line of the driving lane and additionally in presence of the host vehicle's lane-deviation tendency.

8. The automotive lane deviation prevention apparatus as claimed in claim 1, wherein the processor is further programmed for:

detecting a host vehicle speed, a host vehicle's yaw angle with respect to a direction of the host vehicle's driving lane, a host vehicle's lateral displacement from a central axis of the host vehicle's driving lane, and a curvature of the host vehicle's driving lane;
calculating a future lateral-displacement estimate based on the host vehicle speed, the yaw angle, the lateral displacement, and the curvature; and
determining that the host vehicle tends to deviate from the driving lane, when an absolute value of the future lateral-displacement estimate is greater than or equal to a predetermined lateral-displacement criterion.

9. The automotive lane deviation prevention apparatus as claimed in claim 1, wherein the processor is further programmed for:

calculating a braking/driving force controlled variable of each of the road wheels so that a yaw moment is produced in a direction in which the host vehicle's lane-deviation tendency is avoided, in presence of the host vehicle's lane-deviation tendency; and
controlling braking/driving forces of the road wheels, responsively to the braking/driving force controlled variables calculated.

10. The automotive lane deviation prevention apparatus as claimed in claim 8, wherein the processor is further programmed for:

calculating a braking/driving force controlled variable of each of the road wheels so that a yaw moment is produced in a direction in which the host vehicle's lane-deviation tendency is avoided, in presence of the host vehicle's lane-deviation tendency;
controlling braking/driving forces of the road wheels, responsively to the braking/driving force controlled variables calculated;
calculating, based on a difference between the future lateral-displacement estimate and the predetermined lateral-displacement criterion, a desired yaw moment to be exerted on the host vehicle; and
calculating, based on the desired yaw moment, the braking/driving force controlled variable of each of the road wheels.

11. The automotive lane deviation prevention apparatus as claimed in claim 1, wherein the processor is further programmed for:

controlling a braking force of each of road wheels so that a yaw moment is produced in a direction in which the host vehicle returns to the central position of the driving lane, when the host vehicle is traveling on the predetermined irregularities formed on or close to either one of the left-hand side lane marking line and the right-hand side lane marking line of the driving lane.

12. The automotive lane deviation prevention apparatus as claimed in claim 11, wherein the processor is further programmed for:

calculating a braking/driving force controlled variable of each of the road wheels so that a predetermined constant yaw moment is produced in a direction in which the host vehicle returns to the central position of the driving lane, when the host vehicle is traveling on the predetermined irregularities formed on or close to either one of the left-hand side lane marking line and the right-hand side lane marking line of the driving lane; and controlling braking/driving forces of the road wheels, responsively to the braking/driving force controlled variables calculated.

13. The automotive lane deviation prevention apparatus as claimed in claim 1, wherein the processor is further programmed for:

producing a steering torque in a direction in which the host vehicle returns to the central position of the driving lane, when the host vehicle is traveling on the predetermined irregularities formed on or close to either one of the left-hand side lane marking line and the right-hand side lane marking line of the driving lane.

14. An automotive lane deviation prevention apparatus according to claim 1, further comprising:

a yawing-motion control actuator that adjusts a yaw moment exerted on the host vehicle.

15. A method of preventing lane deviation of a host vehicle employing braking force actuators that adjust braking forces applied to respective road wheels, the method comprising:

capturing a picture image in front of the host vehicle;

searching for a lane marking line based on the captured picture image;

detecting whether the host vehicle is traveling on predetermined irregularities formed on or close to either one of a left-hand side lane marking line and a right-hand side lane marking line of a driving lane that produce vibratory motion input into the host vehicle;

in the event of detection of the lane marking line, determining whether the host vehicle tends to deviate from the driving lane and executing lane deviation prevention (LDP) control by which the host vehicle's lane deviation tendency is avoided, in presence of the host vehicle's lane-deviation tendency;

when the host vehicle is traveling on the predetermined irregularities formed on or close to either one of the left-hand side lane marking line and the right-hand side lane marking line of the driving lane that produce vibratory motion input into the host vehicle, executing vehicle yawing motion control by feedback-control of the braking forces applied to the road wheels by which the host vehicle yaws away from a side position of the driving lane;

in the event that there is no detection of a lane marking line and the vehicle is traveling on the predetermined irregularities formed on or in close proximity to either one of the left-hand side lane marking line and the right-hand side lane marking line of the driving lane, providing the vehicle a first desired yaw-moment controlled variable to avoid deviating from the driving lane; and in the event of the host vehicle's lane deviation tendency detected based on lane marking line detection, providing a second desired yaw-moment controlled variable to avoid deviating from the driving lane and, if the vehicle is traveling on the predetermined irregularities formed on or close to either one of the left-hand side lane marking line and the right-hand side lane marking line of the driving lane, correcting the second desired yaw-moment controlled variable to a large value.

16. The apparatus of claim 1, wherein the first desired yaw-moment controlled variable and the second desired yaw-moment controlled variable correlate to a desired magnitude of yaw moment to be imparted on the vehicle to yaw the vehicle away from the side position of the driving lane.

17. The method of claim 15, wherein the first desired yaw-moment controlled variable and the second desired yaw-moment controlled variable correlate to a desired magnitude of yaw moment to be imparted on the vehicle to yaw the vehicle away from the side position of the driving lane.

* * * * *